(12) United States Patent
Kanisawa et al.

(10) Patent No.: US 7,467,101 B2
(45) Date of Patent: Dec. 16, 2008

(54) COMMODITY ORDER SYSTEM

(75) Inventors: Hiroaki Kanisawa, Hino (JP); Susumu Honda, Chino (JP)

(73) Assignee: Seiko Epson Corporation, Tokyo (JP), .

( * ) Notice: Subject to any disclaimer, the term of this patent is extended or adjusted under 35 U.S.C. 154(b) by 802 days.

(21) Appl. No.: 10/491,792

(22) PCT Filed: Feb. 18, 2003

(86) PCT No.: PCT/JP03/01721

§ 371 (c)(1),
(2), (4) Date: Apr. 6, 2004

(87) PCT Pub. No.: WO03/069528

PCT Pub. Date: Aug. 21, 2003

(65) Prior Publication Data

US 2005/0086117 A1    Apr. 21, 2005

(30) Foreign Application Priority Data

Feb. 18, 2002  (JP) .............................. 2002-040687
Feb. 18, 2002  (JP) .............................. 2002-040691

(51) Int. Cl.
*G06Q 30/00* (2006.01)
(52) U.S. Cl. .......................................... 705/26; 703/37
(58) Field of Classification Search .................... 705/26
See application file for complete search history.

(56) References Cited

U.S. PATENT DOCUMENTS

| 7,257,547 B1 | 8/2007 | Terase | |
| 2003/0078793 A1* | 4/2003 | Toth | ............................ 705/1 |

FOREIGN PATENT DOCUMENTS

| JP | 06-52193 A | 2/1994 |
| JP | 06-325040 A | 11/1994 |
| JP | 07-282134 A | 10/1995 |

(Continued)

OTHER PUBLICATIONS

Quain, Bill; Sansbury, Michael W.; LeBruto, Stephen M., Increasing restaurant profitability.(Revenue Enhancement, part 4)(Focus on Food Service), Cornell Hotel & Restaurant Administration Quarterly , 40 , 3 , 38(1), Jun. 1999, 13 pages, downloaded form Dialog Web on the Internet on Mar. 2, 2008.*

*Primary Examiner*—James Zurita
(74) *Attorney, Agent, or Firm*—Sughrue Mion, PLLC

(57) ABSTRACT

The object of the present invention is to provide a product ordering system, product ordering method and program thereof that is capable of promoting the sales of a product or service by managing order information by identifying an orderer and using information presented to ordering terminals.

The product ordering system of the present invention is equipped with a plurality of ordering terminals installed at predetermined locations which acquire order information by prompting an orderer to select and order desired products or services, the ordering terminals are equipped with an identification information acquisition unit that acquires orderer identification information that identifies the orderer, and an order information management unit that manages the order information acquired from the order terminals by correlating with the orderer identification information acquired by the identification information acquisition unit equipped on the ordering terminals.

17 Claims, 19 Drawing Sheets

FOREIGN PATENT DOCUMENTS

| | | |
|---|---|---|
| JP | 08-147567 A | 6/1996 |
| JP | 2000-293580 A | 10/2000 |
| JP | 2001-134673 A | 5/2001 |
| JP | 2002-189788 A | 7/2002 |
| JP | 2002-245229 A | 8/2002 |
| JP | 2002-279525 A | 9/2002 |

* cited by examiner

FIG. 8

COOKING INSTRUCTIONS SCREEN ~50

| ORDER NUMBER/ TABLE NAME | ORDERER IDENTIFICATION CODE | ORDERED PRODUCT NAME | QUANTITY | ELAPSED TIME | | |
|---|---|---|---|---|---|---|
| 1011 A1 | ID01XX | A SET | 1 | X MINUTE(S) | START | END |
| 1012 A4 | ID04XX | B SET | 1 | X MINUTE(S) | START | END |
| 1013 B1 | ID05XX | .. | 3 | X MINUTE(S) | START | END |
| .. | .. | .. | .. | .. | .. | .. |

51 — START
52 — END
53 — TABLE
53 — ORDERED PRODUCT
55 — TIME

FIG. 9

SERVING INSTRUCTIONS SCREEN

| ORDER NUMBER/ TABLE NAME | ORDERER IDENTIFICATION CODE | ORDERED PRODUCT NAME | QUANTITY | COOKING STATUS | |
|---|---|---|---|---|---|
| 1011 A1 | ID01XX | A SET | 1 | COMPLETED | SERVED |
| 1012 A4 | ID04XX | B SET | 1 | SCHEDULED TO BE COMPLETED IN 5 MINUTES | SERVED |
| 1013 B1 | ID05XX | C | 3 | NOT COOKING | SERVED |
| .. | .. | .. | .. | .. | .. |

TABLE — 62
ORDERED PRODUCT — 63
TIME — 64
SERVED — 61

60

COMMODITY ORDER SYSTEM

TECHNICAL FIELD

The present invention relates to a product ordering system that performs order management and promotes product or service sales, a product ordering method and its program, based on order information acquired by an ordering terminal in the ordering terminal installed on a table in a restaurant that prompts orderers to order food and drink.

BACKGROUND ART

Conventional systems performed order management by assigning identification numbers to each ordering terminal installed in each table in, for example, a restaurant, and managing order information in the form of food and drink ordered at each table using those identification numbers. Namely, these systems managed cooking instructions for foods and drinks ordered from the ordering terminals for each table, where the food and drink is to be served, and billing processing for the foods and drinks served.

As described above, since order information is managed using identification numbers that identify each table and ordering terminals installed at the tables, for example, during the time a customer A who has finished eating is waiting to make payment, if another customer B sits at the table where customer A had been eating and orders from the ordering table installed at that table, since the order information is managed by an identification number, there was the problem in which the charge for the order is mistakenly added to the amount of payment of customer A.

In addition, as another example, in the case a customer has moved to a different table during the course of a meal, since the order information of the order placed at the table before the customer moved and the order information placed at the table after the customer moved are managed with identification numbers for each table, there is the problem of a mistake being made when serving which results in food being served to the table before the customer moved. This also resulted in the problem of greater complexity of settling payments when paying the bill.

Moreover, in the case of conventional systems, a system was used in which predetermined products or services are offered for each ordering terminal installed at each table in, for example, a restaurant, and orderers place orders by selecting a desired product or service from among them.

However, in the case of this conventional system, although predetermined products or services are offered with ordering terminals, a system was desired that allowed information presented on ordering terminals to be changed at suitable times in order to more effectively promote sales of products or services.

DISCLOSURE OF INVENTION

The object of the present invention is to provide a product ordering system, product ordering method and its program which manage order information by identifying orderers, and promote sales of products or services using information presented to ordering terminals.

The aspect of the present invention is a product ordering system has a plurality of ordering terminals installed at predetermined locations which acquire order information by prompting an orderer to select and order desired products or services, an identification information acquisition unit, provided in each ordering terminal, that acquires orderer identification information that identifies the orderer, and an order information management unit that manages order information acquired from the order terminals by correlating with orderer identification information acquired by the identification information acquisition unit equipped on the ordering terminals.

As a result, according to the present invention, since order information is managed by correlating with orderer identification information, order information can be managed for each orderer by identifying orderers. As a result, there is no confusion when paying bills even if an orderer has changed seats.

In addition, the aspect of the present invention is the ordering terminals has an information presentation unit that presents presented information containing presented product information for prompting orderers to select and order products or services, and a presented information control unit that allows the contents of the presented information presented by the information presentation unit to be changed at arbitrary times.

As a result, according to the present invention, the information presentation unit is able to change the presented product information presented to orderers at arbitrary times. As a result, presented information can be changed at arbitrary times for the purpose of promoting sales of products or services, and the information presentation units of the ordering terminals can be effectively used to promote sales of products or services.

BRIEF DESCRIPTION OF DRAWINGS

FIG. 8 is a drawing shown an example of a cooking instructions screen 50 presented by a product ordering system in a first and second embodiment of the present invention.

FIG. 9 is a drawing showing an example of a serving instructions screen 60 presented by a product ordering system in a first and second embodiment of the present invention.

BEST MODE FOR CARRYING OUT THE INVENTION

The following provides an explanation of the present invention through its embodiments. However, the following embodiments do not limit the invention described in the claims, and all of the combinations of the characteristics explained in the embodiments are not necessarily required for the means of the present invention for solving the problems of the prior art.

FIRST EMBODIMENT

First, an explanation is provided of a first embodiment of a product ordering system with respect to the case of managing order information relating to food and drink orders at a restaurant.

Figure 1:
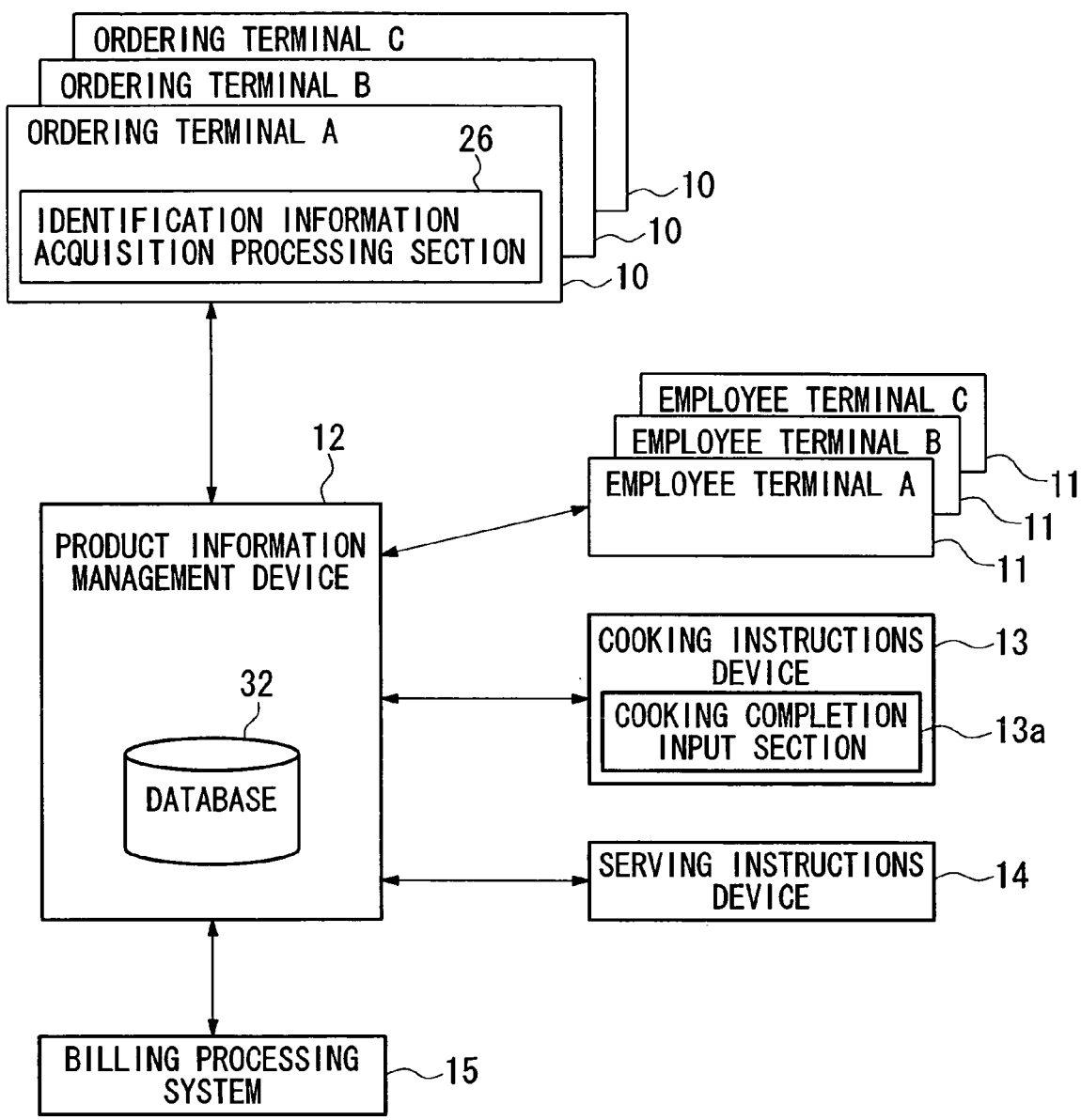
FIG. 1 is a block diagram showing the general constitution of a product ordering system according to a first and second embodiment of the present invention.

FIG. 1 is a block drawing showing the general constitution of a product ordering system according to a first embodiment of the present invention.

In this drawing, reference symbol 10 indicates ordering terminal A, ordering terminal B, ordering terminal C and so forth (to be collectively referred to as ordering terminal 10), which is installed on each table where an orderer sits and acquires order information by displaying a product ordering screen that prompts the orderer to select and order a desired product or service. Furthermore, ordering terminal 10 is equipped with an identification information acquisition processing section 26 that reads orderer identification codes from a magnetic card on which is recorded an orderer identification code (orderer identification information) given out to each orderer in order to identify orderers. In addition, the detailed constitution of ordering terminal 10 will be described later.

Reference symbol 11 indicates employee terminal A, employee terminal B, employee terminal C and so forth (to be collectively referred to as employee terminal 11) that presents instructions to employees working at a restaurant, information to be provided to employees and so forth and by which various information is entered by employees. Reference symbol 12 indicates a product order management device that manages order information acquired by ordering terminal 10 by correlating with orderer information codes acquired by identification information acquisition processing section 26. In addition, product order management device 12 is equipped with a database 32 that stores information relating to products displayed on ordering terminal 10 and various information for managing order information. Furthermore, the detailed internal constitution of product order management device 12 will be described later.

Reference symbol 13 indicates a cooking instructions device equipped with a display section that presents the cooking instructions screen shown in FIG. 8 as cooking instructions presented to food preparers who prepare foods and drinks so that the food desired by the orderer is cooked. FIG. 8 is a drawing showing an example of cooking instructions screen 50 presented by a product ordering system in a first embodiment of the present invention. As shown in this drawing, cooking instructions screen 50 contains "order numbers" serving as numbers that specify orders, "table names" that specify the tables where orderers are sitting, "orderer identification codes" that identify orderers, "ordered product names" which are the names of ordered products specified with the "order numbers", "quantity" which is the ordered number of ordered products specified with "order numbers", and "elapsed time" which indicates the amount of time that has elapsed since an order was received.

In addition, cooking instructions screen 50 contains a "start button" 51 that is pressed when cooking of the ordered product is begun. As a result of pressing this "start button" 51, cooking instructions device 13 transmits information that cooking of the ordered product in the same line as "start button" 51 has begun to product order management device 12. As a result, product order management device 12 is able to manage cooking starting times. Moreover, product order information management device 12 is able to predict and manage cooking completion time of the ordered product according to starting time and cooking time by storing information relating to the average cooking time of each ordered product.

In addition, cooking instructions screen 50 contains an "end button" 52 that is pressed when cooking has been completed. As a result, cooking completion input section 13a equipped in cooking instructions device 13 transmits cooking completion information to the effect that cooking of the ordered product in the same line as "end button" 52 has been completed, and the line in which "end button" 52 was pressed is deleted from cooking instructions screen 50. In addition, in the case there is an ordered product which must be cooked particularly quickly for some reason (such as in response to a customer complaint or when service is slow), cooking instructions screen 50 contains an underline that is added to the "ordered product name" (B Set) of an ordered product required to be cooked quickly as shown in the drawing. As a result, cooking instructions device 13 is able to emphasize that an underlined ordered product is to be prepared quickly.

In addition, cooking instructions screen 50 contains a "table button" 53, "ordered product button" 54 and "time button" 55 that are pressed when rearranging the order of ordered products displayed on the screen based on any of the parameters of "by table name", "by ordered product" or "in order of ordering time". Namely, when "table button" 53 is pressed, cooking instructions device 13 displays ordered products on cooking instructions screen 50 by "table name". In addition, when "ordered product button" 54 is pressed, cooking instructions device 13 displays ordered products on cooking instructions screen 50 by "ordered product name". In addition, when "time button" 55 is pressed, cooking instructions device 13 displays ordered products on cooking instructions screen 50 in order of "elapsed time". In addition, cooking instructions device 13 has a function that displays the total number of orders determined by totaling the number of orders for each type of ordered product on cooking instructions screen 50 in order starting with the earliest ordering time of those orders contained in each type of ordered product.

Reference symbol 14 indicates a serving instructions device equipped with a display section that presents a serving instructions screen as shown in FIG. 9 as serving instructions that instruct foods and drinks that have finished being prepared to the table where the orderer is seated. FIG. 9 is a drawing showing an example of a serving instructions screen 60 presented by a product ordering system in a first embodiment of the present invention. As shown in this drawing, serving instructions screen 60 contains "order numbers", "table names", "orderer identification codes", "ordered product names" and "quantities" as explained in FIG. 8, as well as "cooking status" serving as information relating to the cooking status of ordered products.

Furthermore, as shown in the drawing, examples of information indicated as "cooking status" include "completed", which indicates that cooking of an ordered product has been completed, "scheduled to be completed in X minutes", which indicates that cooking of an ordered product is scheduled to be completed in X minutes, and "not cooking", which indicates that cooking of an ordered product has not been begun. In addition, the "X minutes" of the time information indicated in "scheduled to be completed in X minutes" is determined from the difference between the starting time managed in product order management device 12 and the completion time determined from the average cooking time of the ordered product as a result of "start button" 51 being pressed when cooking is started on cooking instructions screen 50.

In addition, serving instruction screen 60 also contains an underline that is added to the "ordered product name" (B Set) of an ordered product required to be cooked particularly quickly in the same manner as cooking instructions screen 50. As a result, serving instructions device 14 is able to emphasize that an underlined ordered product is to be served quickly. Furthermore, the method for emphasizing these rush orders on cooking instructions screen 50 and serving instructions screen 60 is not limited to the methods described above, but rather various methods may be preferably used for emphasizing the target "ordered product name", such as by changing the color of the target "ordered product name" or by causing the target "ordered product name" to flash. In addition, input of information specifying rush orders is performed from employee terminal 11, cooking instructions device 13 and serving instructions device 14.

In addition, serving instructions screen 60 contains a "serving completed button" 61 that is pressed when serving or after serving has been completed. As a result, completion of serving is notified to product order management device 12, and the line in which "serving completed button" 61 was pressed is deleted from serving instructions screen 60. In addition, serving instructions screen 60 contains a "table button" 62, "ordered product button" 63 and "time button" 64 that are pressed in order to rearrange the order of ordered products displayed on the screen based on any of the parameters of "by table name", "by ordered product" or "in order of ordering time". Namely, when "table button" 62 is pressed, serving instructions device 14 displays ordered products on serving instructions screen 60 by "table name". In addition, when "ordered product button" 63 is pressed, serving instructions device 14 displays ordered products on serving instructions screen 60 by "ordered product name". In addition, when "time button" 64 is pressed, serving instructions device 14 displays ordered products on serving instructions screen 60 in order of "elapsed time". In addition, serving instructions device 14 has a function that displays the total number of orders determined by totaling the number of orders for each type of ordered product on serving instructions screen 60 in order starting with the earliest ordering time of those orders contained in each type of ordered product.

Reference symbol 15 indicates a billing processing system that collectively performs billing processing based on orderer identification codes for the total price of products ordered (or ordered and served) from product order management device 12 by an orderer. The product ordering system of the present invention is composed in the manner explained above. Furthermore, communication between each terminal and device preferably uses wireless communication, a dedicated line or a local area network (LAN).

Furthermore, the aforementioned ordering terminal 10, employee terminal 11, product order management device 12, cooking instructions device 13, serving instructions device 14 and billing processing system 15 are equipped with a display device (or display section) such as a cathode ray tube (CRT) or liquid crystal display device, and an input device such as a keyboard or mouse. In addition, although the aforementioned keyboard and mouse are typically used as input devices for entering commands and data into a computer, input devices are not limited to these, but rather a pointing device such as a tracking ball, image scanner, optical character reader (OCR), bar code reader, pen entry device, voice recognition device or touch panel may also be used.

Next, an explanation is provided of the internal constitution of ordering terminal 10.

Figure 2:
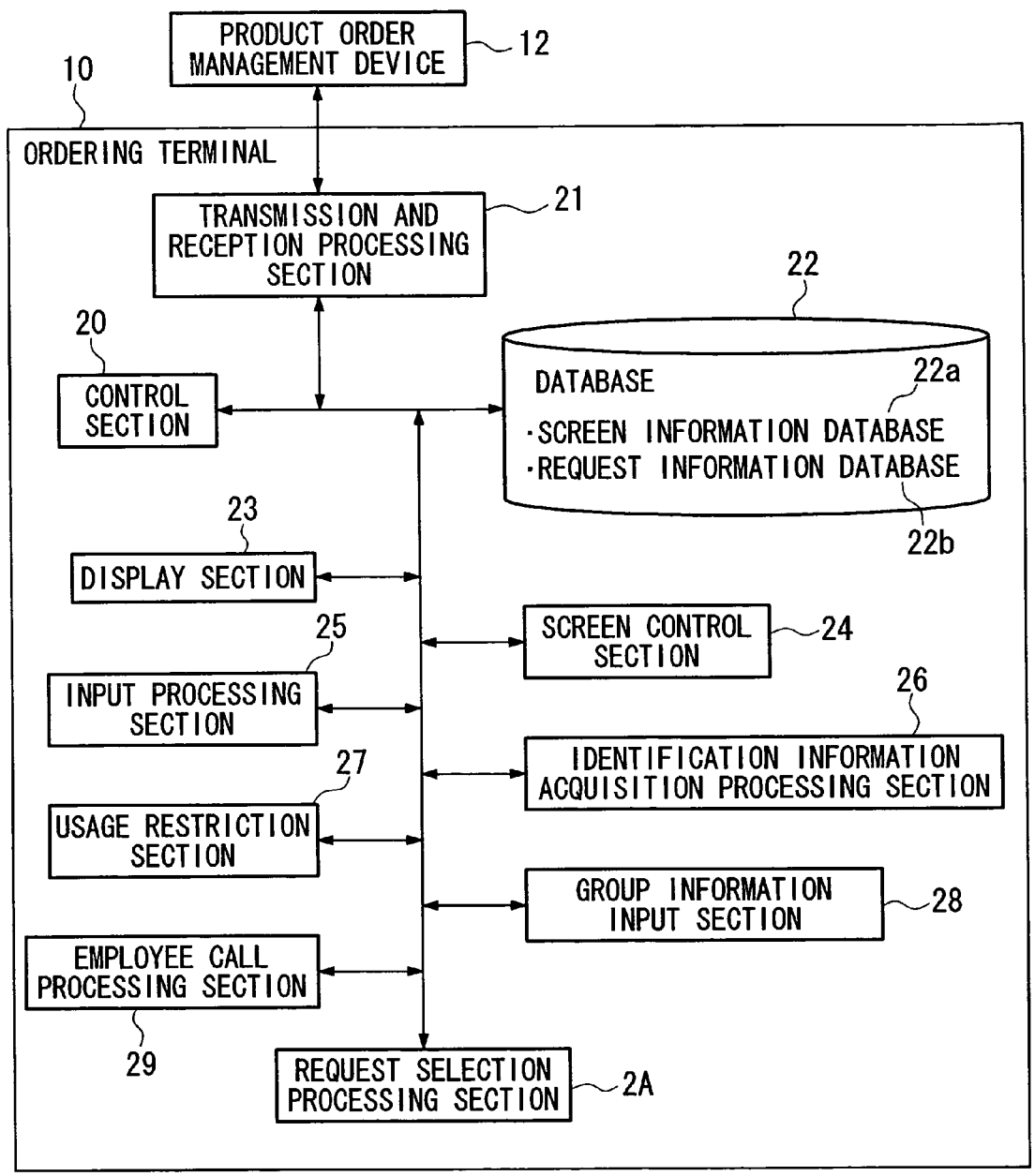
FIG. 2 is a drawing showing the general constitution of an ordering terminal 10 in a first and second embodiment of the present invention.

FIG. 2 is a drawing showing the general constitution of ordering terminal 10 in a first embodiment of the present invention. In this drawing, reference symbol 20 indicates a control section that controls data within ordering terminal 10. Reference symbol 21 indicates a transmission and reception processing section that performs communication with product order management device 12. Reference symbol 22 indicates a database that stores various information used by ordering terminal 10. Reference symbol 23 is a display section that displays information such as that which prompts the ordering of products. Here, an explanation is provided of constitution examples of a screen information database 22a and a request information database 22b equipped in database 22.

First, an explanation is provided of an example of the constitution of screen information database 22a.

Figure 5A:
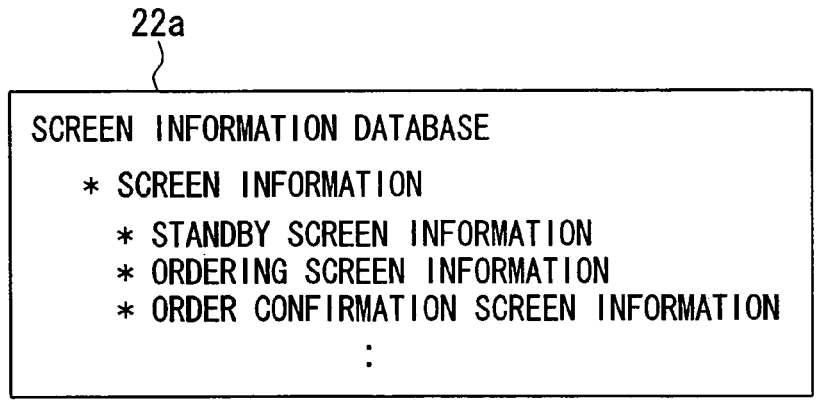
FIG. 5A to FIG. 5C are drawings showing an example of the constitution of an image information database 22a, a request information database 22 and a seating information database 36b equipped in an ordering terminal 10 in a first embodiment of the present invention.

FIG. 5A is a drawing showing an example of the constitution of screen information database 22a equipped in ordering terminal 10 in a first embodiment of the present invention. In this drawing, "screen information" refers to information serving as a sample of various screens displayed on display section 23. "Standby screen information" refers to sample information of a screen displayed on display section 23 of ordering terminal 10 at a table where a customer is not sitting, or a screen displayed on display section 23 during the time until a customer sits at a table and passes a magnetic card through identification information acquisition processing section 26. A screen such as that which presents advertising information or announcement information and so forth is preferable for the standby screen displayed on display section 23 by ordering terminal 10.

Figure 10:
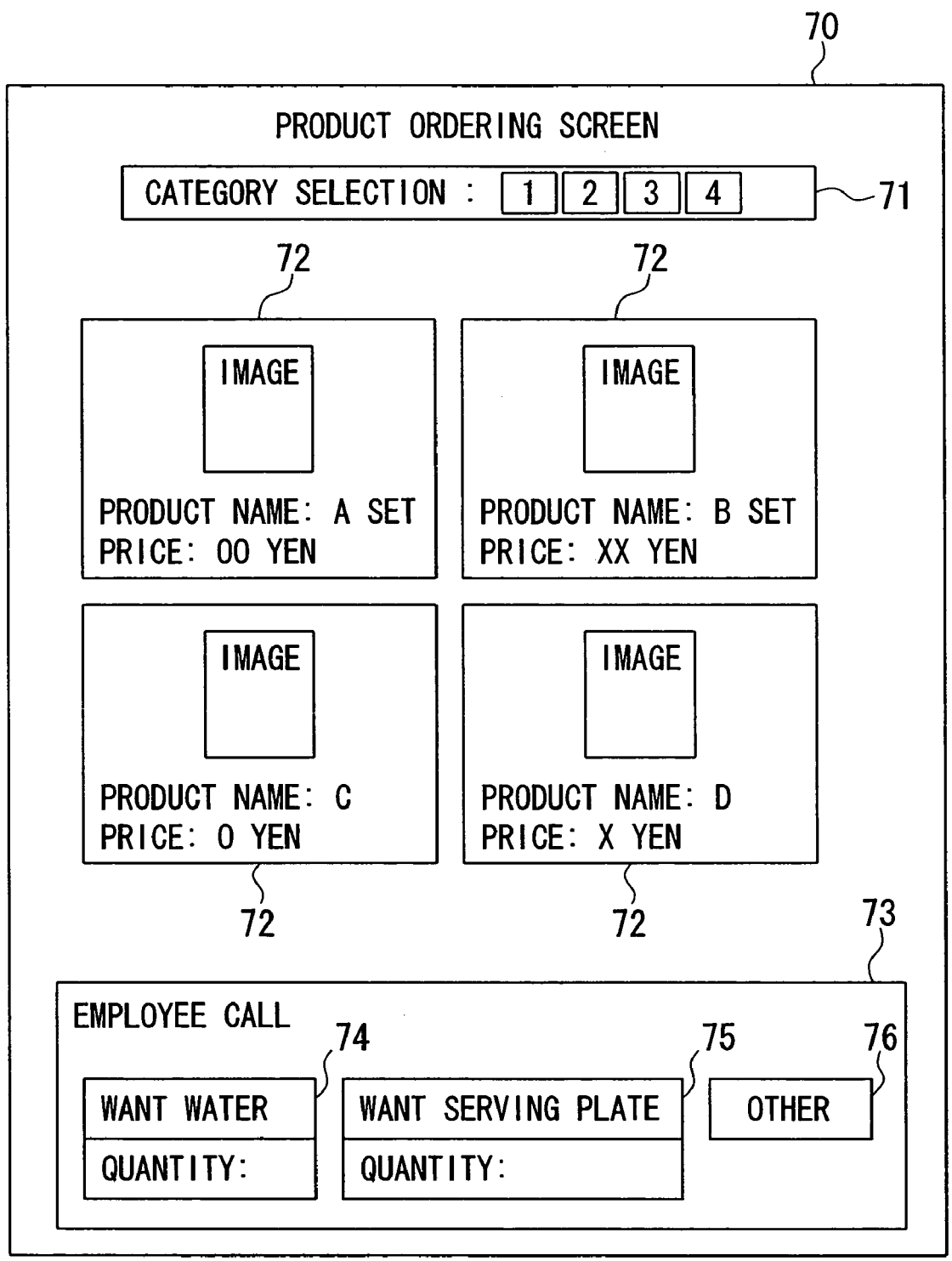
FIG. 10 is a drawing showing an example of a product ordering screen 70 presented on a display section 23 by an ordering terminal 10 in a first and second embodiment of the present invention.

"Ordering screen information" refers to the storage of sample information of a screen for presenting, for example, a product ordering screen 70 shown in FIG. 10 on display section 23. FIG. 10 is a drawing showing an example of product ordering screen 70 presented by ordering terminal 10 on display section 23 in a first embodiment of the present invention. In this drawing, a category selection field 71 is a field for selecting the category of a product to be ordered in the manner of, for example 1 for "Japanese style food", 2 for "Western style food", 3 for desserts and 4 for beverages. A product display field 72 is a field for presenting an image of the product, product name and price.

In addition, an employee call field 73 is a field that contains buttons that allow employees to be called by pressing. At this time, customers can be prompted to select and enter those requests for which employees are frequently called. For example, "want water" can be conveyed to an employee as the quantity of cups of an entered number by entering a number in input field 74. In addition, a request for serving plates can be conveyed to an employee in the quantity of an entered number by entering a number in input field 75. In addition, an "Other" button 76 should be pressed when calling an employee to make other requests.

Furthermore, employee call field 73 is preferably made to be presented on not only the product ordering screen, but also displayed on various screens for which there is likely to be the need to call an employee. In addition, the contents that can be selected as a request for calling an employee may be changed in employee call field 73 according to the particular screen status.

Figure 11:
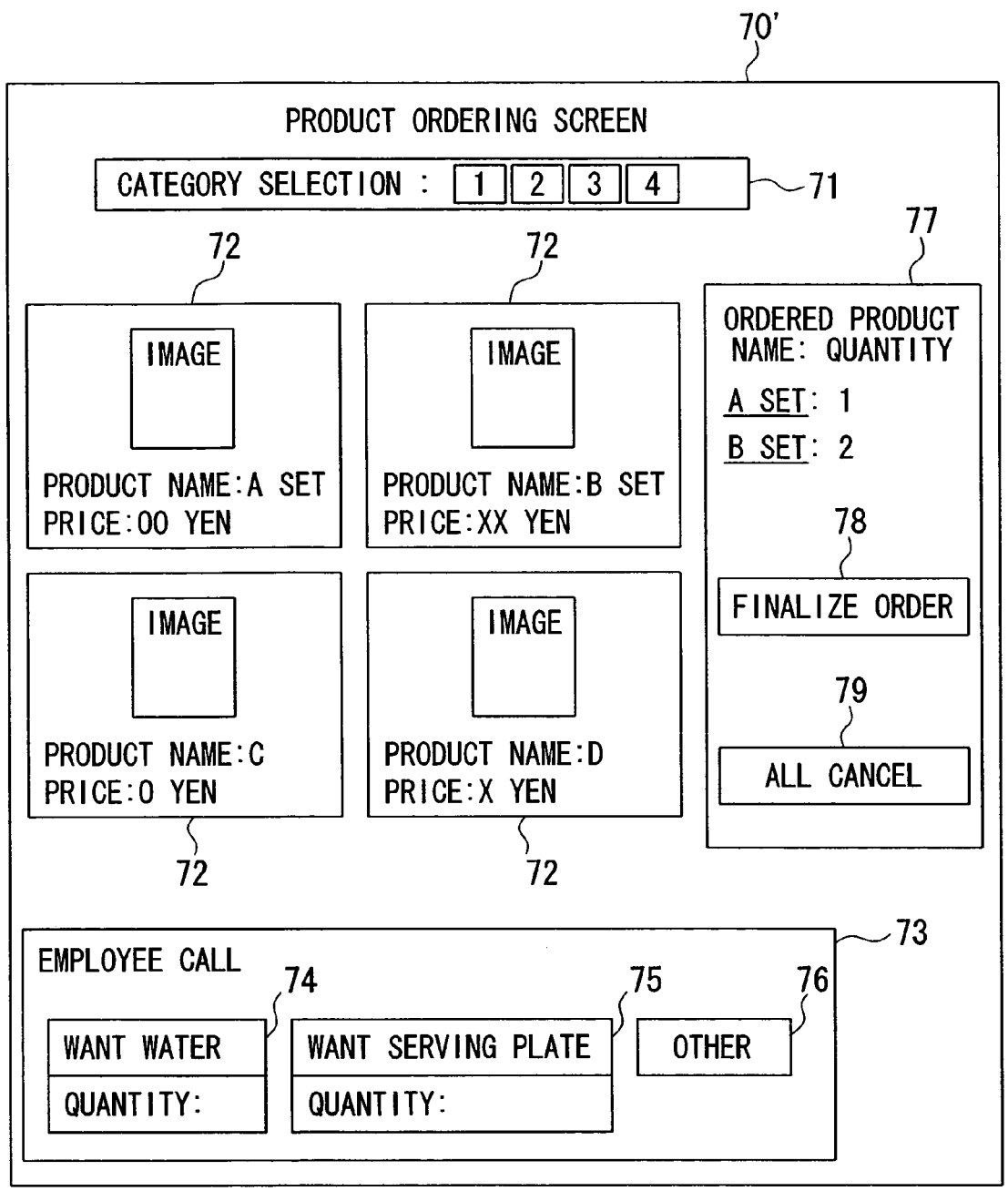
FIG. 11 is a drawing showing an example of a product ordering screen 70' presented on a display section 23 by an ordering terminal 10 in a first and second embodiment of the present invention.

"Order confirmation screen information" refers to sample information of a screen on which product ordering screen 70' shown in FIG. 11, which additionally contains order confirmation field 77 for confirming ordering information on the aforementioned product ordering screen 70, is presented to display section 23. In addition, order confirmation field 77 contains a "finalize order button" 78, which finalizes an order confirmed in order confirmation field 77, and an "all cancel" button 79, which cancels all orders confirmed in order confirmation field 77. In addition, when an underlined ordered product name is touched in order confirmation field 77, ordering terminal 10 displays a product group detailed information screen 80 shown in FIG. 12(*a*) on display section 23. As shown in this drawing, detailed information about the ordered product selected in order confirmation field 77 is presented to detailed information field 81. As has been indicated above, screen information database 22*a* stores samples of various screens displayed on display section 23.

Next, an explanation is provided of an example of the constitution of request information database 22*b* using the drawings.

Figure 5B:
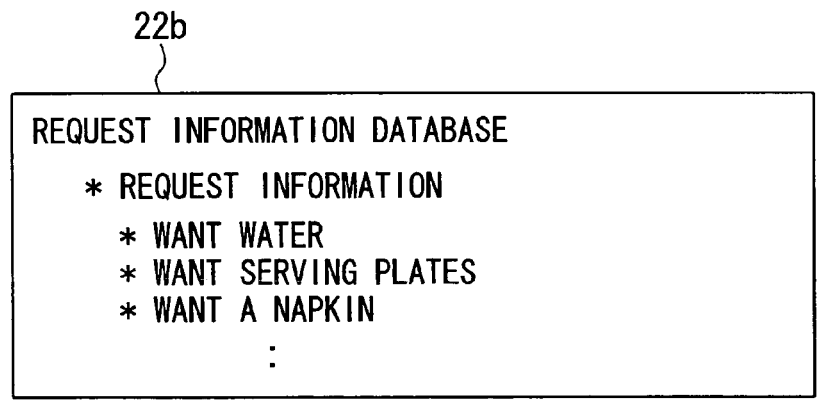

FIG. 5B is a drawing showing an example of the constitution of request information database 22*b* equipped in ordering terminal 10 in a first embodiment of the invention. In this drawing, "request information" refers to the information displayed on display section 23 relating to requests for which employees are frequently called by customers. Examples of these requests include "want water", "want serving plates" and "want a napkin", and constitute the information shown for the choices displayed in the employee call field 73 of FIG. 10. As a result, in the case a customer desires to call an employee, by presenting requests for which calls are frequently made and allowing the customer to select a request in advance, the number of times employees have to attend customers can be reduced.

Next, reference symbol 24 indicates a screen control section that controls screens presented to display section 23 by referring to screen sample information from screen information database 22*a*. Reference symbol 25 indicates an input processing section in the form of a touch panel installed on the display screen of display section 23 that performs input processing corresponding to the screen display. Reference symbol 27 indicates a usage restriction section that allows usage of ordering terminal 10 after identification information acquisition processing section 26 has acquired an orderer identification code. As a result, since an orderer identification code can be acquired by a magnetic card before using ordering terminal 10 is used by an orderer, changing seats by the orderer can be determined promptly. In addition, this can also prevent tampering with ordering terminal 10.

Figures 12A, 12B:
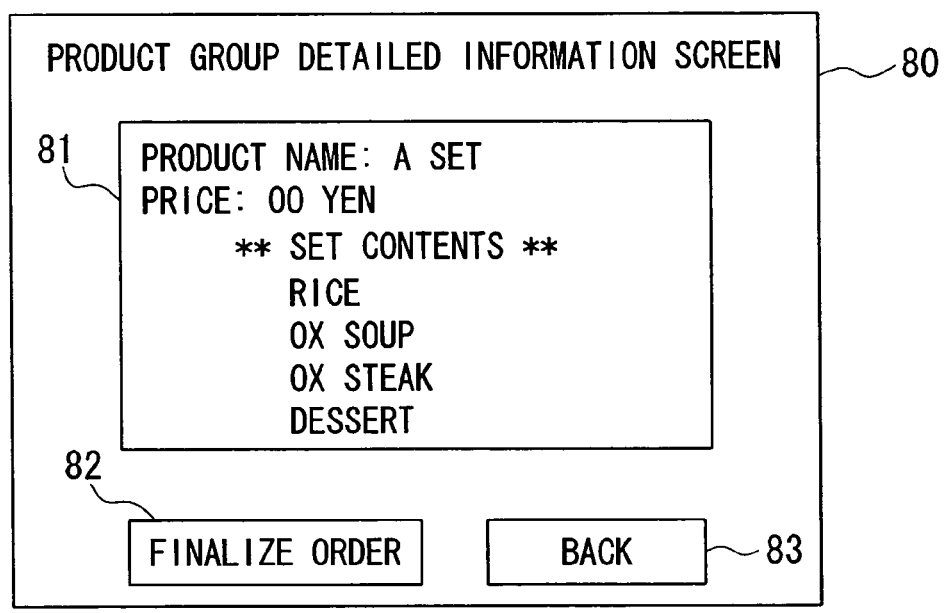
FIG. 12A and FIG. 12B are drawings showing an example of a product group detailed information screen 80 and a grouping screen 85 presented on a display section 23 by an ordering terminal 10 in a first and second embodiment of the present invention.

Reference symbol 28 indicates a group information input section that presents a grouping screen 85 shown in FIG. 12B on which group information is entered to display section 23 by correlating a plurality of orderer identification codes with a group ID that specifies groups according to bill. On this grouping screen 85, an employee performs processing that assigns a predetermined group ID to an orderer identification code. Furthermore, the manner of grouping orderer identification codes is not limited to the method described above, but rather a method may be employed in which a common group ID is assigned to an orderer information code by passing a plurality of magnetic cards imparted with a group of orderer identification codes through identification information acquisition processing section 26 after switching ordering terminal 10 to a group mode.

Reference symbol 29 indicates an employee call processing section that presents the employee call field 73 shown in FIGS. 10 and 11 to display section 23. Reference symbol 2A indicates a request selection processing section that presents choices to display section 23 that prompt the selection of a request (input fields 74 and 75 in FIG. 10) to call an employee contained in this employee call field 73. Furthermore, request selection processing section 2A may suitably change the contents of the aforementioned choices in consideration of displayed screen contents, changes in orders, elapsed time after ordering and so forth. As has been shown above, ordering terminal 10 is able to present product ordering screen 70 to customers using display section 23 by acquiring the necessary information from product order management device 12 and database 22.

Next, an explanation of the internal constitution of product order management device 12 is provided with reference to the drawings.

Figure 3:
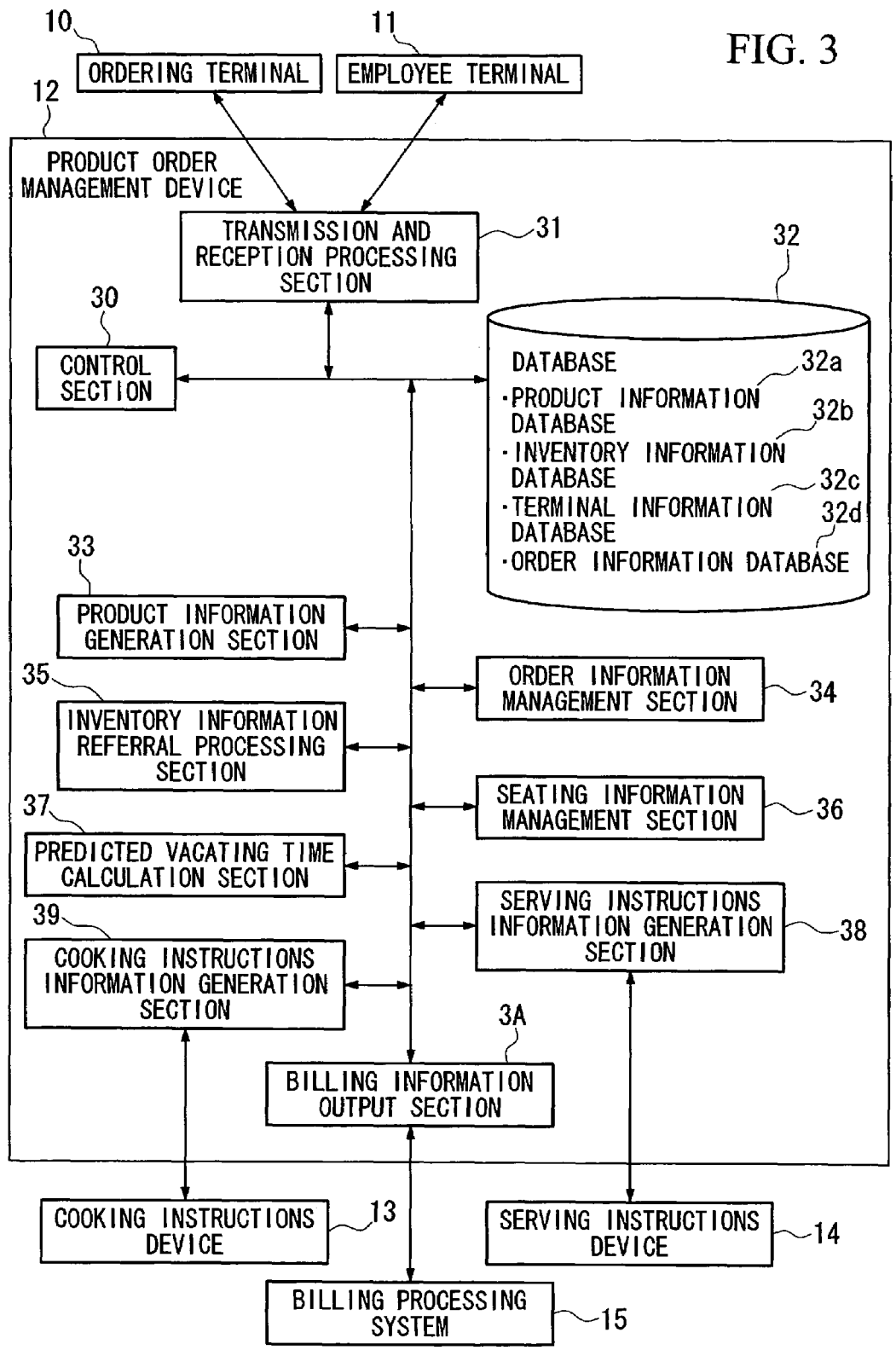
FIG. 3 is a drawing showing the general constitution of a product order management device 12 in a first embodiment of the present invention.

FIG. 3 is a drawing showing the general constitution of product order management device 12 in a first embodiment of the present invention. In this drawing, reference symbol 30 indicates a control section that controls data within product order management device 12. Reference symbol 31 indicates a transmission and reception processing section that receives and transmits various information with ordering terminal 10 and employee terminal 11. Reference symbol 32 indicates a database that stores information for managing information presented to ordering terminal 10 and order information. Database 32 is equipped with product information database 32a that stores information relating to products for which orders are received, inventory information database 32b that stores information relating to inventory of these products, terminal information database 32c that stores information relating to the correspondence between ordering terminal 10 and each table, and order information database 32d that stores information relating to order information containing orderer identification codes. The following provides an explanation of examples of the constitutions of the aforementioned four databases.

First, an explanation is provided of product information database 32a with reference to the drawings.

Figure 6A:
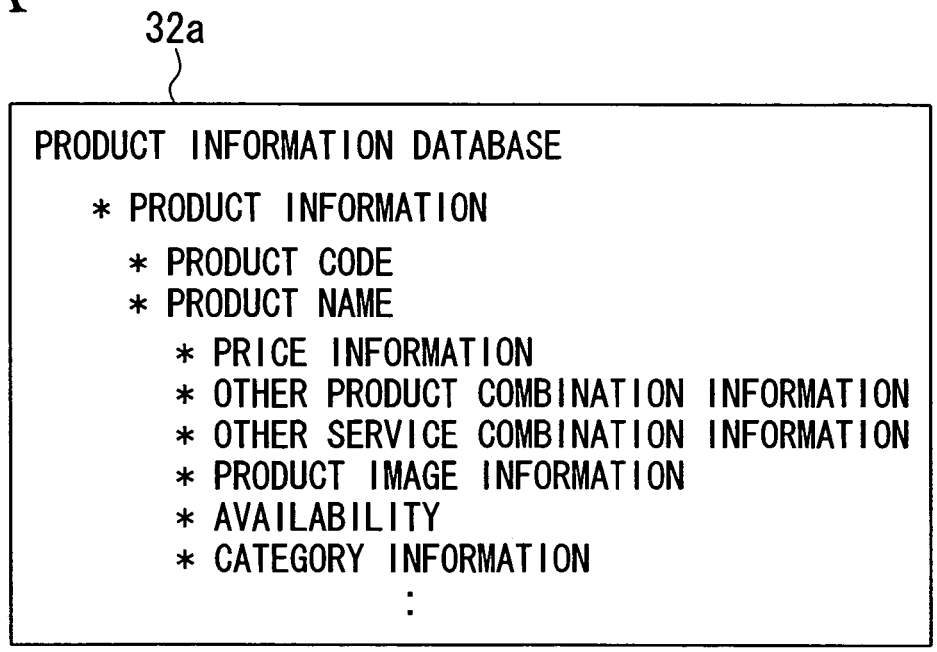
FIG. 6A and FIG. 6B are drawings showing an example of the constitution of a product information database 32a and an inventory information database 32b equipped in a product order management device 12 in a first embodiment of the present invention.

FIG. 6A is a drawing showing an example of the constitution of product information database 32a equipped in product order management device 12 in a first embodiment of the present invention. As shown in this drawing, the information indicated below is stored as "product information". "Product code" refers to an identifier that specifies a product. "Product name" refers to the name of the product specified with the "product code". "Price information" refers to information relating to the price of the product specified with the "product code". "Other product combination information" refers to information relating to combinations in the case of selling the product in combination with other products. Combinations with other products refer to, for example, information relating to combination in the case of selling a plurality of products as a set.

"Other service combination information" refers to information relating to products incorporated with, for example, services offered for a limited period of time. "Product image information" refers to information relating to image data of the product specified with the "product code". "Availability" refers to information relating to the time period during which the product specified with the "product code" is sold. "Category information" refers to information relating to the category (such as Japanese-style food, Western-style food, dessert or beverage) of the product specified with the "product code". Furthermore, various information may also be managed with dedicated databases, such as managing "product image information" with a dedicated database.

Next, an explanation is provided of inventory information database 32b with reference to the drawings.

Figure 6B:
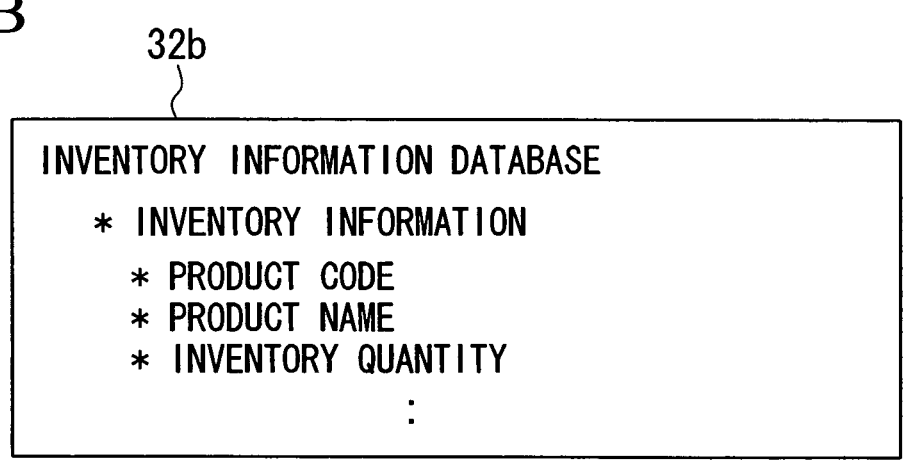

FIG. 6B is a drawing showing an example of the constitution of inventory information database 32b equipped in product order management device 12 in a first embodiment of the present invention. As shown in the drawing, the following information is stored as "inventory information". "Product code" refers to an identifier that specifies a product. "Product name" refers to the name of the product specified with the "product code". "Inventory quantity" refers to information relating to the inventory quantity of the product specified with the "product code".

Next, an explanation is provided of terminal information database 32c with reference to the drawings.

Figure 7A:
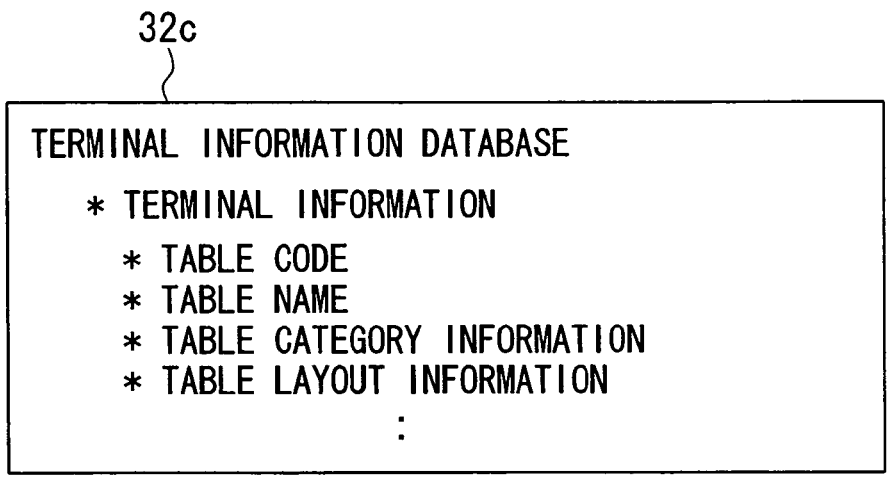
FIG. 7A and FIG. 7B are drawings showing an example of the constitution of a terminal information database 32c and an order information database 32d equipped in a product order management device 12 in a first embodiment of the present invention.

FIG. 7A is a drawing showing an example of the constitution of terminal information database 32c equipped in product order management device 12 in a first embodiment of the present invention. As shown in the drawing, the following information is stored as "terminal information". "Table code" refers to an identifier that specifies a table and the ordering terminal 10 installed at the table. "Table name" refers to the unique name of each table given by an employee for identifying each table. Furthermore, "table code" and "table name" may be assigned by dividing a counter at arbitrary intervals if the table is in the form of a counter.

In addition, "table category information" refers to information relating to the category of the table specified with the "table code" (counter, round table, low table, etc.), equipment information (information relating to the installed ordering terminal, information as to whether or not the table has a grilling plate, etc.) and whether the table is a smoking table or non-smoking table. "Table layout information" refers to information relating to the installed location of the table specified with the "table code". As has been indicated above, since one ordering terminal 10 corresponds to one table, terminal information database 32c also stores information relating to each table as information relating to ordering terminal 10.

Next, an explanation is provided of order information database 32d with reference to the drawings.

Figure 7B:
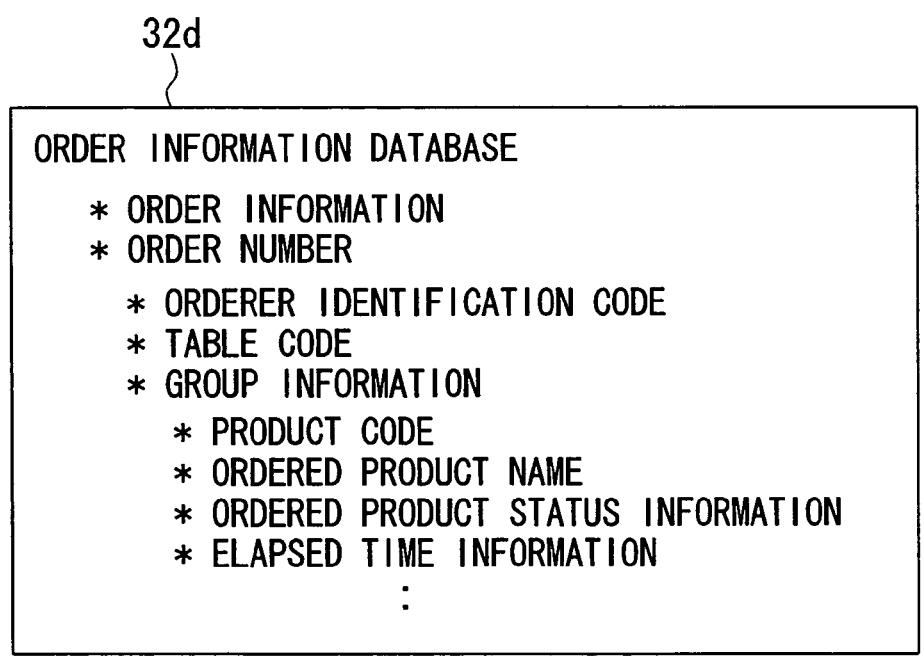

FIG. 7B is a drawing showing an example of the constitution of order information database 32d equipped in product order management device 12 in a first embodiment of the present invention. As shown in the drawing, the information shown below is stored as "order information". "Order number" refers to a number arbitrarily assigned by order information management section 34 for specifying an order. "Orderer identification code" refers to information that specifies an orderer who placed the order specified with the "order number". "Table code" refers to an identifier that specifies the table where the orderer is setting who is specified with the "orderer identification code". "Group information" refers to information that includes a group ID that identifies a group in the case the orderer specified with the "orderer identification code" is categorized as a separately billed group.

"Product code" refers to an identifier that specifies a product ordered in the order specified with the "order number". "Ordered product name" is the name of the ordered product specified with the "product code". "Ordered product status information" refers to information that indicates the status (before cooking, currently cooking, cooked, served, etc.) of the ordered product specified with the "order number" and "product code". "Elapsed time information" refers to information that indicates the elapsed time since an order has been placed for the product specified with the "order number" and the "product code". As has been indicated above, order information database 32d stores order information relating to ordered products.

Here, the explanation returns to the internal constitution of product order management device 12. Reference symbol 33 indicates a product information generation section that generates screen information required for generating product ordering screen 70 shown in FIG. 10 by referring to product information from product information database 32a based on a request from ordering terminal 10. Furthermore, although product ordering screen 70 is generated by product information generation section 33 and screen control section 24 within ordering terminal 10, the division of processing that generates product ordering screen 70 based on various information should be arbitrarily determined in consideration of the communication capacity, processing capacity and so forth of product order management device 12 and ordering terminal 10.

Reference symbol 34 indicates an order information management section that manages order information acquired by ordering terminal 10 by correlating with an orderer identification code acquired by identification information acquisition processing section 26 equipped in ordering terminal 10. Furthermore, although not shown in the drawings, order information management section 34 is equipped with a temporary order information storage section that stores order information at the stage it has been selected prior to pressing "finalize order button" 78, which finalizes an order confirmed in order confirmation field 77 of product ordering screen 70', in the form of temporary order information.

Reference symbol 35 indicates an inventory information referral processing section that prevents products for which there is no inventory from being selected on product ordering screen 70 based on inventory information referred to from inventory information database 32b when product information generation section 33 generates screen information for product ordering screen 70. Reference symbol 36 indicates a seating information management section that manages seating information including information that correlates the table where ordering terminal 10 is installed, the table code that identifies ordering terminal 10, and the orderer identification code of the orderer seated at the table.

Here, an explanation is provided of a first embodiment with respect to the internal constitution of seating information management section 36.

Figure 4:
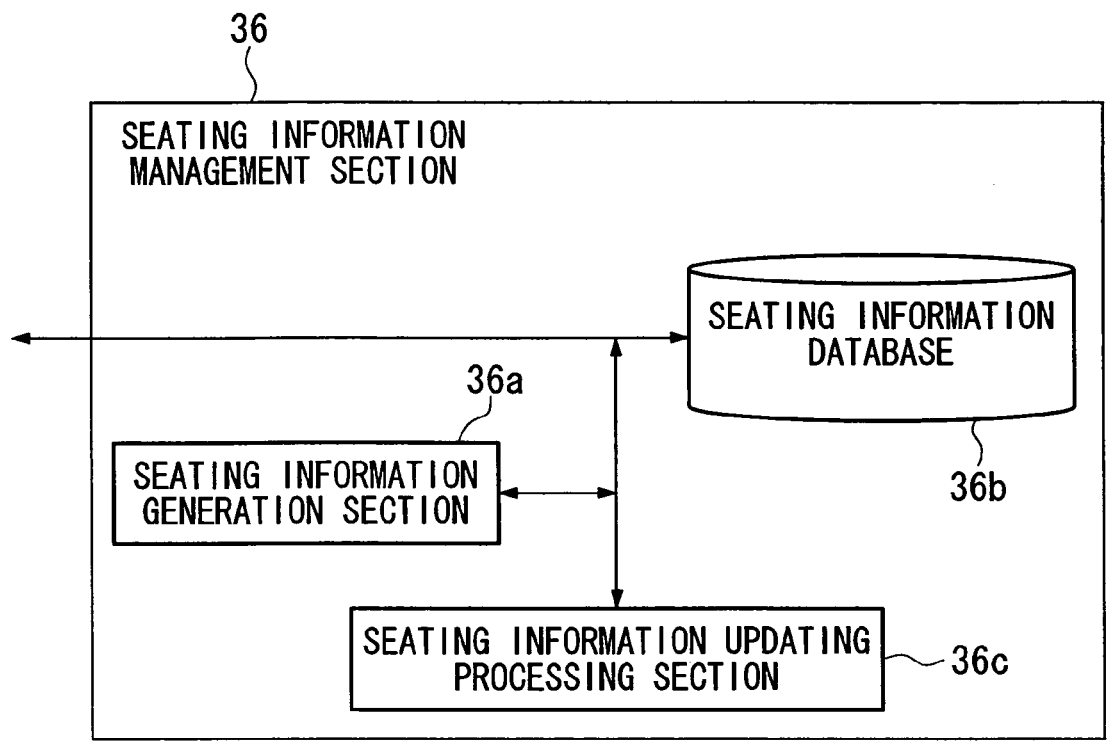
FIG. 4 is a block drawing showing the internal constitution of a seating information management section 36 equipped in a product order management device 12 in a first embodiment of the present invention.

FIG. 4 is a block diagram showing the internal constitution of seating information management section 36 equipped in product order management device 12 in a first embodiment of the present invention. In the drawing, reference symbol 36a indicates a seating information generation section that generates seating information that correlates the table code of a table and the orderer identification code whenever the identification information acquisition processing section 26 of ordering terminal 10 installed at a table acquires an orderer identification code. Reference symbol 36b indicates a seating information database that stores seating information that correlates table codes and orderer identification codes.

Here, an explanation is provided of an example of the constitution of seating information database 36b with reference to the drawings.

Figure 5C:
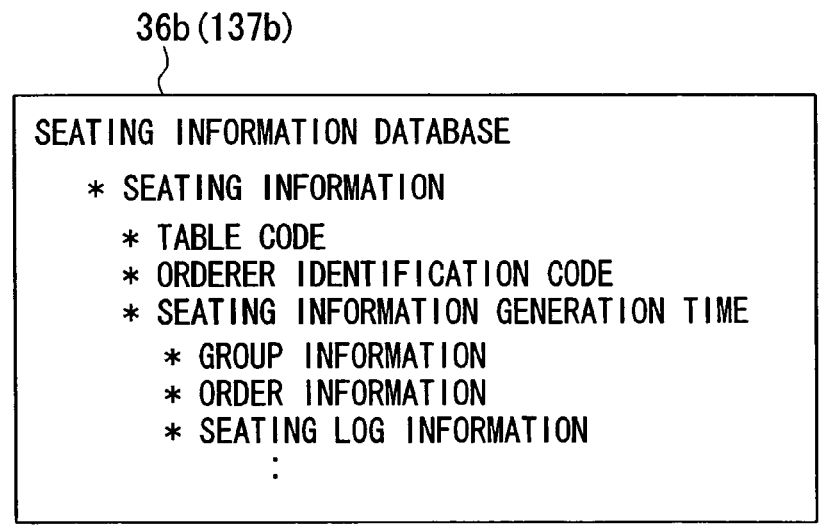

FIG. 5C is a drawing showing an example of the constitution of seating information database 36b equipped in product order management device 12 in a first embodiment of the present invention. As shown in the drawing, the following information is stored as "seating information". "Table code" refers to an identifier that specifies a table. "Orderer identification code" refers to information that specifies the orderer currently seated at the table specified with the "table code". "Seating information generation time" (generation time) refers to information relating to the time and date at which seating information generation section 36 generated "seating information" correlated with the "table code" and "orderer identification code". In addition, "group information" and "order information" are as previously described. "Seating log information" refers to log information of past seating information that has been updated by movement of an orderer to a different table in the case the orderer specified with the "orderer identification code" has moved to a different table.

Reference symbol 36c indicates a seating information updating processing section that updates to the latest seating information based on "seating information generation time" in the case there is a plurality of seating information that contains the same orderer identification code. Furthermore, seating information updating processing section 36c stores seating information that is not the latest seating information stored in seating information database 36b as "seating log information" in seating information database 36b. As has been indicated above, seating information management section 36 manages the latest seating information as well as a log of past seating information.

Reference symbol 37 indicates a predicted vacating time calculation section that calculates the predicted time at which an orderer will vacate the table at which the orderer is currently seated by referring to the order status of the orderer and the elapsed time from the time the orderer sat at the table based on "order information" managed by order information management section 34 by correlating with the orderer identification code. Reference symbol 38 indicates a serving instructions information generation section that generates serving instructions information for presenting service instructions to serving instructions device 14 by referring to "seating information" at the time cooking is completed from seating information database 36b based on the orderer identification code correlated with "order information" of the food for which cooking has been completed.

Reference symbol 39 indicates a cooking instructions information generation section that generates cooking instructions information for presenting cooking instructions to cooking instructions device 13 based on "order information" managed by order information management section 34. Reference symbol 3A indicates a billing information output section that collectively outputs "order information" correlated with the orderer identification code or "order information" correlated with "group information" in the form of billing information in response to a request from billing processing system 15.

As has been shown above, product order management device 12 performs various processing for managing "order information".

Furthermore, ordering terminal 10 is not limited to a form equipped with user identification processing section 10a, but rather may be of a form in which a user identification processor and so forth is provided separately, and ordering terminal 10 is connected with the user identification processor. In addition, although the description of the aforementioned embodiment was presented with respect to order management including cooking and preparation of foods and beverages in response to orders for foods and beverages, the present embodiment is not limited to this, but rather may also be an embodiment in which the aforementioned "foods and beverages" are replaced with "various products", and the aforementioned "cooking and preparation" is replaced with "preparations for providing products".

In addition, in the aforementioned embodiment, although a magnetic card and a scanning device that scans the magnetic card (identification information acquisition processing section 26) are used as a method for acquiring orderer identification codes, the embodiment is not limited to this, but rather various other methods for acquiring information that specifies orderers are suitably used, examples of which include a method that uses an IC card containing a recording medium that allows non-contact scanning and writing of information and a scanning device that scans the information contained in the IC card, and a method that uses a card imprinted with a bar code and a scanning device that scans the bar code.

In addition, each of the aforementioned processing sections shown in FIGS. 2, 3 and 4 may also be realized with dedicated hardware, or each processing section may be composed with memory and CPU (central processing unit), and its function may be realized by loading a program for realizing the function of each processing section into memory and running that program.

In addition, the aforementioned memory may be composed of a recording medium that can be read and written by a computer using a hard disk device, magnetooptical disk device, non-volatile memory such as flash memory, CD-ROM or other read-only recording medium, volatile memory like random access memory (RAM) or a combination thereof.

Next, an explanation is provided of the operation of the aforementioned product ordering system.

Figure 13:
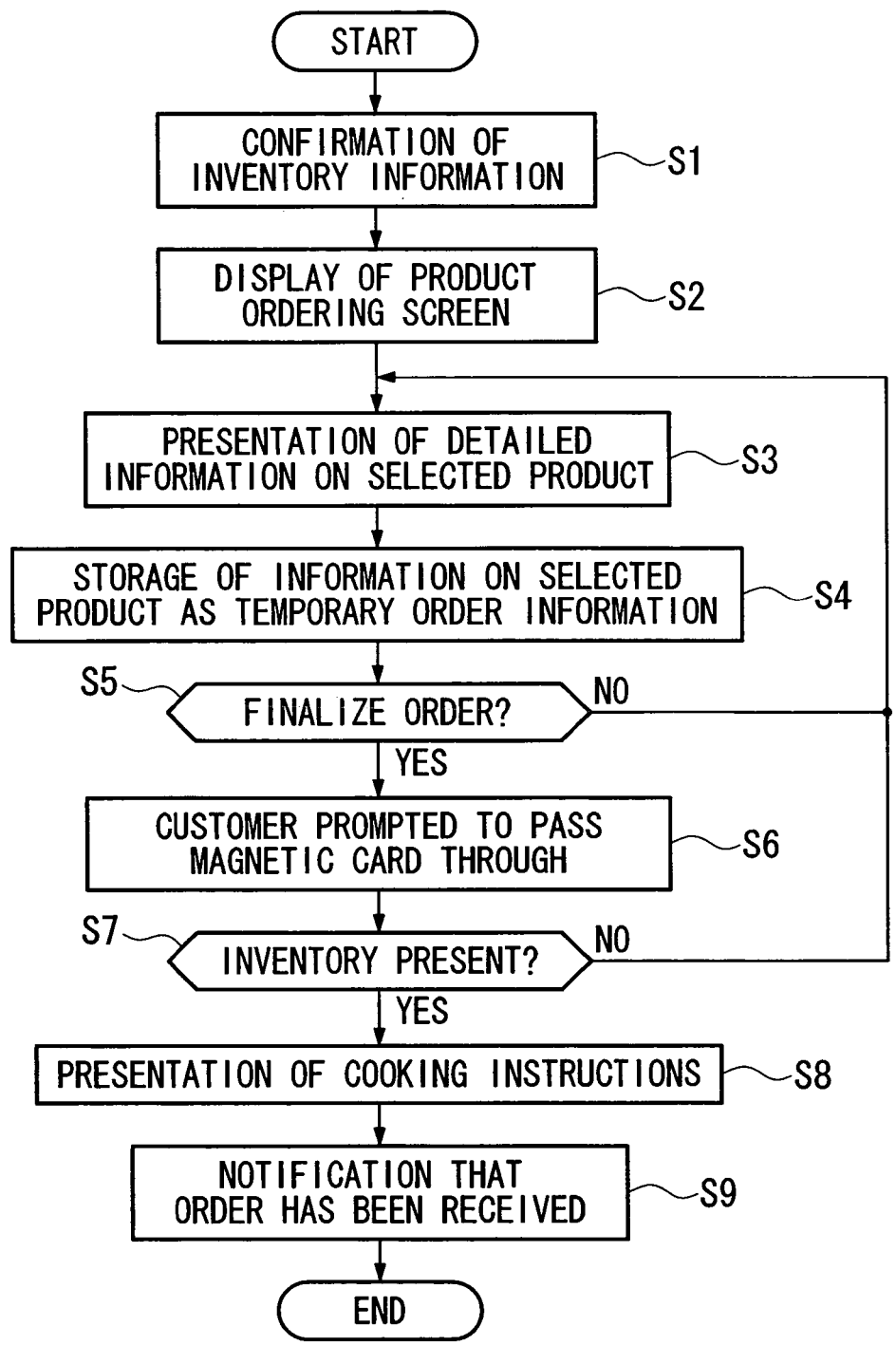
FIG. 13 is a flow chart showing the operation of a product ordering system in a first embodiment of the present invention.

FIG. 13 is a flow chart showing the operation of a product ordering system in a first embodiment of the present invention. First, when a customer enters an establishment, a magnetic card containing an orderer identification code that specifies the customer as an orderer is given out in the number required by the customer (equal to the number of separately billed groups). Furthermore, a predetermined number of magnetic cards may be produced in advance, or the product ordering system may be additionally equipped with a magnetic card production device, and magnetic cards containing orderer identification codes may be produced using that magnetic card production device.

Next, the customer sits at a table, and passes the magnetic card that has been given out through identification information acquisition processing section 26 of ordering terminal 10 installed at the table. As a result, usage restriction section 27 of ordering terminal 10 allows the use of ordering terminal 10. Next, a request for product information to generate product ordering screen 70 is transmitted by ordering terminal 10 to product order management device 12. As a result of transmission and reception processing section 31 of product order management device 12 receiving that request, inventory information referral processing section 35 confirms inventory by referring to inventory information database 32*b* for "inventory information" of products scheduled to be displayed on product ordering screen 70 (Step S1).

Next, screen information required for generating product ordering screen 70 is generated from product information database 32*a* based on a request from ordering terminal 10 by referring to product information for which inventory was confirmed by inventory information referral processing section 35. Next, transmission and reception processing section 31 transmits screen information generated by product information generation section 33 to ordering terminal 10. As a result, transmission and reception processing section 21 of ordering terminal 10 receives that screen information, and screen control section 24 presents product ordering screen 70 to display section 23 based on the received screen information and "ordering screen information" referred to from screen information database 22 (Step S2).

In addition, separate from the processing of inventory information referral processing section 35, during generation of screen information for product ordering screen 70 by product information generation section 33, those products among the products displayed on product ordering screen 70 for which there is no inventory may be made to not be able to be selected based on inventory information referred to from inventory information database 32*b*. As a result, a situation that may cause the customer to have an unfavorable impression of the establishment can be avoided since the customer will be able to ascertain that the product is out of stock after ordering. Furthermore, an employee may perform grouping processing as necessary when the customer sits at a table. At this time, group information input section 28 presents to display section 23 the grouping screen 85 shown in FIG. 12B on which group information is input by correlating a plurality of orderer identification codes with a group ID that specifies separately billed groups.

Next, when the customer touches a product name in order confirmation field 77, screen control section 24 presents product group detailed information screen 80 to display section 23 (Step S3). Next, in the case a product has been selected on product group detailed information screen 80 presented to ordering terminal 10, screen control section 24 presents product ordering screen 70' to ordering terminal 10, and displays a list of selected products in order confirmation field 77. At this time, order information management section 34 stores information relating to the selected products in a temporary order information storage section in the form of temporarily order information (Step S4).

Here, in the case the customer decides to order a selected product (Yes in Step S5), the order is finalized on ordering terminal 10 as a result of pressing "finalized order button" 78 of product ordering screen 70' or by pressing "finalize order button" 82 of product group detailed information screen 80. In addition, in the case the customer decides not to order a selected product (No in Step S5), the processing returns to Step S3. Furthermore, the timing by which screen control section 24 presents product group detailed information screen 80 to ordering terminal 10 is not limited to that described above, but rather product group detailed information screen 80 may be presented on various screens in the case the customer has touched a product name.

Next, screen control section 24 presents to display section 23 a screen that prompts the customer to pass the magnetic card through identification information acquisition processing section 26 in order to finalize the order (Step S6). Here, when the magnetic card is passed through, inventory information referral processing section 35 searches for the presence of inventory of the products contained in "order information" by referring to inventory information database 32*b*. Here, in the case there is inventory of a desired product (Yes in Step S7), the processing proceeds to Step S8. In addition, if there is no inventory for the desired product (No in Step S7), ordering terminal 10 is notified to that effect and the processing returns to Step S3.

Next, cooking instructions information generation section 39 generates cooking instructions information for providing cooking instructions to cooking instructions device 13 based on "order information" managed by order information management section 34. Next, cooking instructions device 13 receives the generated cooking instructions information and presents cooking instructions screen 50 (Step S8). Next, ordering terminal 10 is notified to the effect that the aforementioned order has been received (Step S9). As a result of the aforementioned processing, the product ordering system in the present embodiment is able to manage "order information" by correlating with an orderer identification code in the case of ordering a product from ordering terminal 10.

In addition, in the case cooking according to the cooking instructions has been completed, serving instructions information generation section 38 generates serving instructions information for providing serving instructions to serving instructions device 14 by referring to "seating information" at the time cooking is completed from seating information database 36*b* based on an "orderer identification code" correlated to the "order information" of the food or beverage on which cooking or preparation has been completed. Next, serving instructions device 14 receives serving instructions information and presents serving instructions screen 60.

In addition, a program for realizing the functions of the processing sections performing the various processing in FIGS. 2, 3 and 4 may be recorded onto a computer-readable recording medium, and a program recorded on that recording medium may be read by a computer server, and that program may then be executed to carry out the various processing. Furthermore, the "computer server" referred to here includes an OS and hardware such as peripheral equipment.

In addition, a "computer server" also includes a web site service environment (or display environment) in the case of using a WWW server.

In addition, a "computer-readable recording medium" refers to a portable medium such as a flexible disk, magnetooptical disk, ROM or CD-ROM and so forth, or a storage device such as a hard disk contained in a computer server. Moreover, a "computer-readable recording medium" includes a medium that retains a program for a fixed period of time in the manner of volatile memory (RAM) inside a computer server serving as a server or client in the case a program is transmitted via a network such as the Internet or a communication line such as a telephone line.

In addition, the aforementioned program may be transferred from the computer server in which it is stored in a storage device and so forth via a transfer medium or by transfer waves within a transfer medium. Here, the "transfer medium" that transfers the program refers to a medium having the function of transferring information in the manner of a network (communication network) such as the Internet or a communication line such as a telephone line.

In addition, the aforementioned program may also be that for realizing a portion of the aforementioned function. Moreover, it may also be that which is capable of realizing the aforementioned function by combining with a program already recorded in a computer server, namely a so-called differential file (differential program).

Although the above has provided a detailed description of an embodiment of the present invention with reference to the drawings, the concrete constitution is not limited to this embodiment, but rather designs and so forth are also included within a scope that does not deviate from the gist of the invention.

As has been described above, according to the present invention, an inventory information database is additionally provided that stores product inventory information or service availability information as information as to whether or not a service can be provided by correlating with a product identifier that specifies a product or service, and since an inventory information referral unit is additionally provided that prevents a product that is out of stock or a service that cannot be provided from being selected based on inventory information or service availability information referred to from an inventory information database when prompting an orderer to select a desired product or service, an ordering terminal is able to prevent a product that is out of stock from being selected in advance. As a result, since a customer is able to determine which products are out of stock in advance, the customer can be notified that a product is out of stock after ordering, thereby making it possible to prevent the customer from suffering any unpleasantness.

In addition, according to the present invention, since the predetermined location where the aforementioned terminal is installed is a table, and is further provided with a seating information management unit that manages seating information which includes information that correlates table identification information that identifies the table and the ordering terminal and orderer identification information of the orderer seated at the table, since information can be managed by correlating orderer identification information and table identification information, even if an orderer has moved to a different table after ordering, the table identification information of the table after the customer moved and the orderer identification information of the orderer are managed by correlating that information, thereby enabling accurate serving instructions to be made without mistaking the products ordered.

In addition, according to the present invention, since the aforementioned seating information management unit is equipped with a seating information generation unit, which generates seating information that correlates table identification information of a table and orderer identification information whenever the identification information acquisition unit of the ordering terminal installed at the table acquires orderer identification information, a seating information database, which stores seating information in correlation with information on the time and date on which the seating information was generated in the form of a generation date, and a seating information updating unit, which updates seating information to the most recent seating information based on the generation date in the case there is a plurality of seating information containing the same orderer identification information in the seating information database, the most recent seating information can be managed in the seating information database.

In addition, according to the present invention, since the aforementioned ordering terminal is equipped with a usage restriction unit that allows the use of the ordering terminal after an identification information acquisition unit has acquired orderer identification information, misuse of the ordering terminal can be prevented.

In addition, according to the present invention, in the case the product is a food or beverage that is cooked or prepared after receiving an order, since an order information management unit is additionally equipped with a cooking instructions unit that presents food cooking instructions to food preparers by managing the order information of the food acquired by an ordering terminal by correlating with orderer identification information, and a cooking instructions information generation unit that generates cooking instructions information for presenting cooking instructions to the cooking instructions unit based on the aforementioned order information managed by the order information management unit, cooking instructions can be presented based on order information.

In addition, according to the present invention, serving instructions can be presented as a result of being additionally equipped with a serving instructions unit that presents serving instructions so that a food for which cooking has been completed is served to the table where the orderer is seated, and a serving instructions information generation unit that generates serving instructions for presenting serving instructions to the serving instructions unit by referring to seating information at the time cooking is completed from a seating information database based on orderer identification information that correlates with order information of the food for which cooking has been completed.

In addition, according to the present invention, since an order information management unit manages order information by correlating a plurality of orderer identification information with separately billed groups in units of orderers making payment, order information can be managed by correlating with separately billed groups.

In addition, according to the present invention, since an ordering terminal is additionally equipped with a group information input unit that allows input of group information for correlating a plurality of orderer identification information with separately billed groups, changes or corrections can be made in group information at arbitrary times.

In addition, according to the present invention, since the order information management unit uniformly assigns orderer identification information to separately billed groups in units of orderers making payment, orders from orderers of the same group can be managed using the same orderer identification information.

In addition, according to the present invention, as a result of being additionally provided with a predicted vacating time calculation unit that calculates the predicted vacating time of a table at which an orderer is currently sitting by referring to order status of the orderer and the elapsed time since the orderer sat down at the table based on order information managed in correlation with orderer identification information by the order information management unit, the time at which the orderer is predicted to vacate the table where the orderer is currently sitting can be calculated.

In addition, according to the present invention, since an ordering terminal is additionally equipped with an employee call unit for enabling an orderer to call an employee that is providing a product or service, a function can be provided to an orderer that allows an employee to be called at an arbitrary time.

In addition, according to the present invention, since the employee call unit is additionally equipped with a request selection unit that prompts selection of a request for which an employee is called, the number of times an employee goes to the table of an order in response to being called by the orderer can be decreased.

SECOND EMBODIMENT

The following provides an explanation of the present invention using a second embodiment of the invention. However, the following second embodiment does not limit the invention described in the claims, and all of the combinations of the characteristics explained in the embodiments are not necessarily required for the means of the present invention for solving the problems of the prior art.

First, an explanation is provided of a second embodiment of a product ordering system with reference to the drawings in the case of controlling information presented to an ordering terminal used to order foods and beverages at a restaurant.

FIG. 1 is a block drawing showing the general constitution of a sales promotion system according to a second embodiment of the present invention.

In this drawing, reference symbol 10 indicates an ordering terminal A, ordering terminal B, ordering terminal C and so forth (to be collectively referred to as ordering terminal 10), which is installed on each table where an orderer sits and acquires order information by displaying a product ordering screen that prompts the orderer to select and order a desired product or service. Furthermore, ordering terminal 10 is equipped with an identification information acquisition processing section 26 that reads orderer identification codes from a magnetic card on which is recorded an orderer identification code (orderer identification information) given out to each orderer in order to identify orderers. In addition, the detailed constitution of ordering terminal 10 will be described later.

Reference symbol 11 indicates an employee terminal A, employee terminal B, employee terminal C and so forth (to be collectively referred to as employee terminal 11) that presents instructions to employees working at a restaurant, information to be provided to employees and so forth and by which various information is entered by employees. Furthermore, the timing at which the displayed contents of ordering terminal 10 are changed may also be instructed from employee terminal 11. Reference symbol 12 indicates a product order management device that manages order information acquired by ordering terminal 10 by correlating with orderer information codes acquired by identification information acquisition processing section 26, and controls various information presented to ordering terminal 10 based on the order information. In addition, product order management device 12 is equipped with a database 32 that stores information relating to products displayed on ordering terminal 10 and various information for managing order information. Furthermore, the detailed internal constitution of product order management device 12 will be described later.

Reference symbol 13 indicates a cooking instructions device equipped with a display section that presents the cooking instructions screen shown in FIG. 8 as cooking instructions presented to food preparers who prepare foods and drinks so that the food desired by the orderer is cooked. FIG. 8 is a drawing showing an example of cooking instructions screen 50 presented by a product ordering system in a first embodiment of the present invention. As shown in this drawing, cooking instructions screen 50 contains "order numbers" serving as numbers that specify orders, "table names" that specify the tables where orderers are sitting, "orderer identification codes" that identify orderers, "ordered product names" which are the names of ordered products specified with the "order numbers", "quantity" which is the ordered number of ordered products specified with "order numbers", and "elapsed time" which indicates the amount of time that has elapsed since an order was received.

In addition, cooking instructions screen 50 contains a "start button" 51 that is pressed when cooking of the ordered product is begun. As a result of pressing this "start button" 51, cooking instructions device 13 transmits information that cooking of the ordered product in the same line as "start button" 51 has begun to product order management device 12. As a result, product order management device 12 is able to manage cooking starting times. Moreover, product order information management device 12 is able to predict and manage cooking completion time of the ordered product according to starting time and cooking time by storing information relating to the average cooking time of each ordered product.

In addition, cooking instructions screen 50 contains an "end button" 52 that is pressed when cooking has been completed. As a result, cooking completion input section 13a equipped in cooking instructions device 13 transmits cooking completion information to the effect that cooking of the ordered product in the same line as "end button" 52 has been completed, and the line in which "end button" 52 was pressed is deleted from cooking instructions screen 50. In addition, in the case there is an ordered product which must be cooked particularly quickly for some reason (such as in response to a customer complaint or when service is slow), cooking instructions screen 50 contains an underline that is added to the "ordered product name" (B Set) of an ordered product required to be cooked quickly as shown in the drawing. As a result, cooking instructions device 13 is able to emphasize that an underlined ordered product is to be prepared quickly.

In addition, cooking instructions screen 50 contains a "table button" 53, "ordered product button" 54 and "time button" 55 that are pressed when rearranging the order of ordered products displayed on the screen based on any of the parameters of "by table name", "by ordered product" or "in order of ordering time". Namely, when "table button" 53 is pressed, cooking instructions device 13 displays ordered products on cooking instructions screen 50 by "table name". In addition, when "ordered product button" 54 is pressed, cooking instructions device 13 displays ordered products on cooking instructions screen 50 by "ordered product name". In addition, when "time button" 55 is pressed, cooking instructions device 13 displays ordered products on cooking instructions screen 50 in order of "elapsed time". In addition, cooking instructions device 13 has a function that displays the total number of orders determined by totaling the number of orders for each type of ordered product on cooking instructions screen 50 in order starting with the earliest ordering time of those orders contained in each type of ordered product.

Reference symbol 14 indicates a serving instructions device equipped with a display section that presents the serving instructions screen 60 as shown in FIG. 9 as serving instructions that instruct foods and drinks that have finished being prepared to the table where the orderer is seated. FIG. 9 is a drawing showing an example of a serving instructions screen 60 presented by a product ordering system in a first embodiment of the present invention. As shown in this drawing, serving instructions screen 60 contains "order numbers", "table names", "orderer identification codes", "ordered product names" and "quantities" as explained in FIG. 8, as well as "cooking status" serving as information relating to the cooking status of ordered products.

Furthermore, as shown in the drawing, examples of information indicated as "cooking status" include "completed", which indicates that cooking of an ordered product has been completed, "scheduled to be completed in X minutes", which indicates that cooking of an ordered product is scheduled to be completed in X minutes, and "not cooking", which indicates that cooking of an ordered product has not been begun. In addition, the "X minutes" of the time information indicated in "scheduled to be completed in X minutes" is determined from the difference between the starting time managed in product order management device 12 and the completion time determined from the average cooking time of the ordered product as a result of "start button" 51 being pressed when cooking is started on cooking instructions screen 50.

In addition, serving instruction screen 60 also contains an underline that is added to the "ordered product name" (B Set) of an ordered product required to be cooked particularly quickly in the same manner as cooking instructions screen 50. As a result, serving instructions device 14 is able to emphasize that an underlined ordered product is to be served quickly. Furthermore, the method for emphasizing these rush orders on cooking instructions screen 50 and serving instructions screen 60 is not limited to the methods described above, but rather various methods may be preferably used for emphasizing the target "ordered product name", such as by changing the color of the target "ordered product name" or by causing the target "ordered product name" to flash. In addition, input of information specifying rush orders is performed from employee terminal 11, cooking instructions device 13 and serving instructions device 14.

In addition, serving instructions screen 60 contains a "serving completed button" 61 that is pressed when serving or after serving has been completed. As a result, completion of serving is notified to product order management device 12, and the line in which "serving completed button" 61 was pressed is deleted from serving instructions screen 60. In addition, serving instructions screen 60 contains a "table button" 62, "ordered product button" 63 and "time button" 64 that are pressed in order to rearrange the order of ordered products displayed on the screen based on any of the parameters of "by table name", "by ordered product" or "in order of ordering time". Namely, when "table button" 62 is pressed, serving instructions device 14 displays ordered products on serving instructions screen 60 by "table name". In addition, when "ordered product button" 63 is pressed, serving instructions device 14 displays ordered products on serving instructions screen 60 by "ordered product name". In addition, when "time button" 55 is pressed, serving instructions device 14 displays ordered products on serving instructions screen 60 in order of "elapsed time". In addition, serving instructions device 14 has a function that displays the total number of orders determined by totaling the number of orders for each type of ordered product on serving instructions screen 60 in order starting with the earliest ordering time of those orders contained in each type of ordered product.

Reference symbol 15 indicates an billing processing system that collectively performs billing processing based on orderer identification codes for the total price of products ordered (or ordered and served) from product order management device 12 by an orderer. The sales promotion system of the present invention is composed in the manner explained above. Furthermore, communication between each terminal and device preferably uses wireless communication, a dedicated line or a local area network (LAN).

Furthermore, the aforementioned ordering terminal 10, employee terminal 11, product order management device 12, cooking instructions device 13, serving instructions device 14 and billing processing system 15 are equipped with a display device (or display section) such as a cathode ray tube (CRT) or liquid crystal display device, and an input device such as a keyboard or mouse. In addition, although the aforementioned keyboard and mouse are typically used as input devices for entering commands and data into a computer, input devices are not limited to these, but rather a pointing device such as a tracking ball, image scanner, optical character reader (OCR), bar code reader, pen entry device, voice recognition device or touch panel may also be used.

Next, an explanation is provided of the internal constitution of ordering terminal 10.

FIG. 2 is a drawing showing the general constitution of ordering terminal 10 in a first embodiment of the present invention. In this drawing, reference symbol 20 indicates a control section that controls data within ordering terminal 10. Reference symbol 21 indicates a transmission and reception processing section that performs communication with product order management device 12. Reference symbol 22 indicates a database that stores various information used by ordering terminal 10. Reference symbol 23 is a display section (information display unit) that displays information such as that which prompts the ordering of products. Furthermore, display section 23 is assumed to be a liquid crystal display device equipped with a touch panel in the present embodiment. Here, an explanation is provided of constitution examples of a screen information database 22a and a request information database 22b equipped in database 22.

First, an explanation is provided of an example of the constitution of screen information database 22a with reference to the drawings.

FIG. 5A is a drawing showing an example of the constitution of screen information database 22a equipped in ordering terminal 10 in a first embodiment of the present invention. In this drawing, "screen information" refers to information serving as a sample of various screens displayed on display section 23. "Standby screen information" refers to sample information of a screen displayed on display section 23 of ordering terminal 10 at a table where a customer is not sitting, or a screen displayed on display section 23 during the time until a customer sits at a table and passes a magnetic card through identification information acquisition processing section 26. A specific example of this standby screen is preferably a product promotion screen that introduces and advertises products. A preferable example of a standby screen displayed by ordering terminal 10 on display section 23 is a screen that presents advertising information or announcement information. "Ordering screen information" refers to the storage of sample information of a screen for presenting, for example, a product ordering screen 70 shown in FIG. 10 on display section 23. FIG. 10 is a drawing showing an example of product ordering screen 70 presented by ordering terminal 10 on display section 23 in a first embodiment of the present invention. In this drawing, a category selection field 71 is a field for selecting the category of a product to be ordered in the manner of, for example, 1 for "Japanese style food", 2 for "Western style food", 3 for desserts and 4 for beverages. A product display field 72 is a field for presenting an image of the product, product name and price.

In addition, an employee call field 73 is a field that contains buttons that allow employees to be called by pressing. At this time, customers can be prompted to select and enter those requests for which employees are frequently called. For example, "want water" can be conveyed to an employee as the quantity of cups of an entered number by entering a number in input field 74. In addition, a request for serving plates can be conveyed to an employee in the quantity of an entered number by entering a number in input field 75. In addition, an "Other" button 76 should be pressed when calling an employee to make other requests.

Furthermore, employee call field 73 is preferably made to be presented on not only product ordering screen 70, but also displayed on various screens for which there is likely to be the need to call an employee. In addition, the contents that can be selected as a request for calling an employee may be changed in employee call field 73 according to the particular screen status.

"Order confirmation screen information" refers to sample information of a screen which presents to display section 23 a product ordering screen 70' shown in FIG. 11, which additionally contains order confirmation field 77 for confirming ordering information on the aforementioned product ordering screen 70. In addition, order confirmation field 77 contains an "finalize order button" 78, which finalizes an order confirmed in order confirmation field 77, and an "all cancel" button 79, which cancels all orders confirmed in order confirmation field 77. In addition, when an underlined ordered product name is touched in order confirmation field 77, ordering terminal 10 displays a product group detailed information screen 80 shown in FIG. 12A on display section 23. As shown in this drawing, detailed information about the ordered product selected in order confirmation field 77 is presented to detailed information field 81. As has been indicated above, screen information database 22a stores samples of various screens displayed on display section 23.

Next, an explanation is provided of an example of the constitution of request information database 22b using the drawings.

FIG. 5B is a drawing showing an example of the constitution of request information database 22b equipped in ordering terminal 10 in a first embodiment of the present invention. In this drawing, "request information" refers to the information displayed on display section 23 relating to requests for which employees are frequently called by customers. Examples of these requests include "want water", "want serving plates" and "want a napkin", and constitute the information shown for the choices displayed in the employee call field 73 of FIG. 10. As a result, in the case a customer desires to call an employee, by presenting requests for which calls are frequently made and allowing the customer to select a request in advance, the number of times employees have to attend customers can be reduced.

Next, reference symbol 24 indicates a screen control section that controls screens presented to display section 23 by referring to screen sample information from screen information database 22a. Reference symbol 25 indicates an input processing section in the form of a touch panel installed on the display screen of display section 23 that performs input processing corresponding to the screen display. Reference symbol 27 indicates a usage restriction section that allows usage of ordering terminal 10 after identification information acquisition processing section 26 has acquired an orderer identification code. As a result, since an orderer identification code can be acquired by a magnetic card before using ordering terminal 10 is used by an orderer, changing seats by the orderer can be determined promptly. In addition, this can also prevent tampering with ordering terminal 10.

Reference symbol 28 indicates a group information input section that presents a grouping screen 85 shown in FIG. 12B on which group information is entered to display section 23 by correlating a plurality of orderer identification codes with a group ID that specifies groups according to bill. On this grouping screen 85, an employee performs processing that assigns a predetermined group ID to an orderer identification code. Furthermore, the manner of grouping orderer identification codes is not limited to the method described above, but rather a method may be employed in which a common group ID is assigned to an orderer information code by passing a plurality of magnetic cards imparted with a group of orderer identification codes through identification information acquisition processing section 26 after switching ordering terminal 10 to a group mode.

Reference symbol 29 indicates an employee call processing section that presents the employee call field 73 shown in FIGS. 10 and 11 to display section 23. Reference symbol 2A indicates a request selection processing section that presents choices to display section 23 that prompt the selection of a request (input fields 74 and 75 in FIG. 10) to call an employee contained in this employee call field 73. Furthermore, request selection processing section 2A may suitably change the contents of the aforementioned choices in consideration of displayed screen contents, changes in orders, elapsed time after ordering and so forth. As has been shown above, ordering terminal 10 is able to present product ordering screen 70 to customers using display section 23 by acquiring the necessary information from product order management device 12 and database 22.

Next, an explanation of the internal constitution of product order management device 12 is provided with reference to the drawings.

Figure 14:
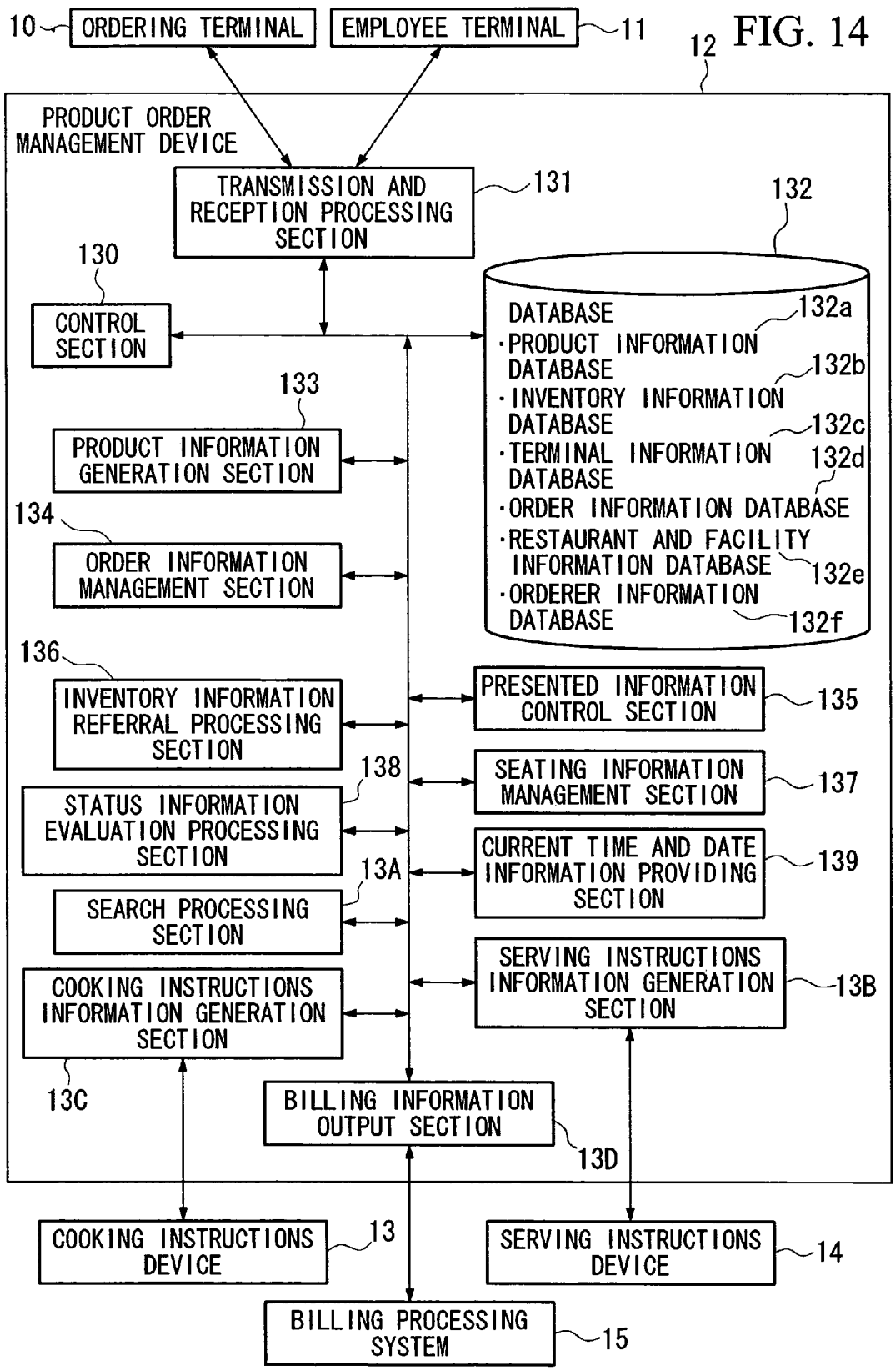
FIG. 14 is a drawing showing the general constitution of a product order management device 12 in a second embodiment of the present invention.

FIG. 14 is a drawing showing the general constitution of a product order information device 12 in a second embodiment of the present invention. In this drawing, reference symbol 130 indicates a control section that controls data within product order management device 12. Reference symbol 131 indicates a transmission and reception processing section that receives and transmits various information with ordering terminal 10 and employee terminal 11. Reference symbol 132 indicates a database that stores information for managing information presented to ordering terminal 10 and order information.

Database 132 is equipped with product information database 132a that stores information relating to products for which orders are received, inventory information database 132b that stores information relating inventory of these products, terminal information database 132c that stores information relating to the correspondence between ordering terminal 10 and table codes, order information database 132d that stores information relating to order information correlated with orderer identification codes, restaurant and facility information database 132e that stores information relating to various restaurants and facilities, and orderer information database 132f that stores information relating to orderers correlated with orderer identification codes. The following provides an explanation of examples of the constitutions of the aforementioned six databases.

First, an explanation is provided of product information database 132a with reference to the drawings.

Figure 16A:
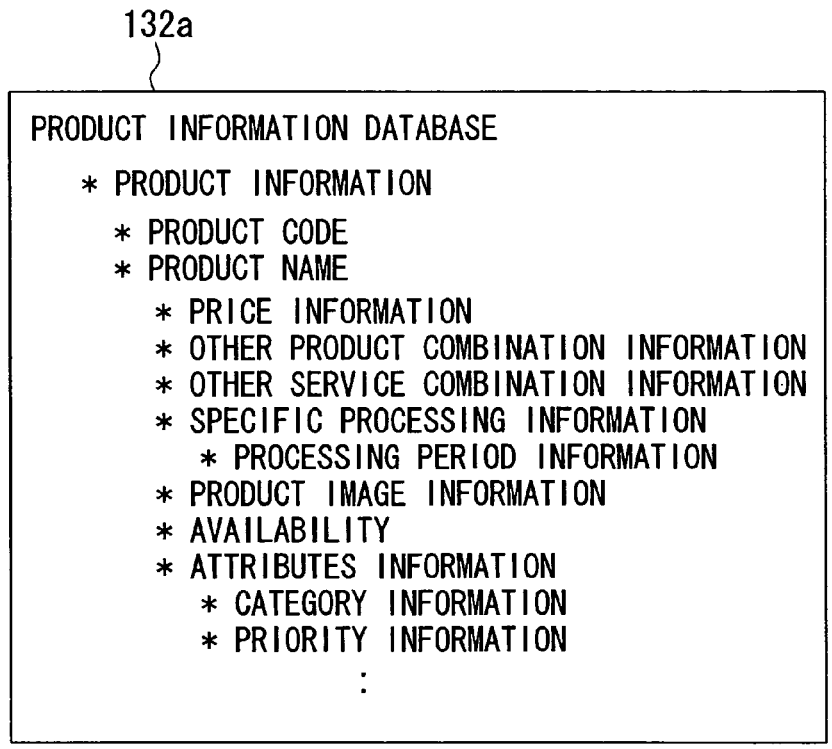
FIG. 16A and FIG. 16B are drawings showing an example of the constitution of a product information database 132a and an inventory information database 132b equipped in a product order management device 12 in a second embodiment of the present invention.

FIG. 16A is a drawing showing an example of the constitution of product information database 132a equipped in product order management device 12 in a second embodiment of the present invention. As shown in this drawing, the information indicated below is stored as "product information". "Product code" refers to an identifier that specifies a product. "Product name" refers to the name of the product specified with the "product code". "Price information" refers to information relating to the price of the product specified with the "product code". "Other product combination information" refers to information relating to combinations in the case of selling the product in combination with other products. Combinations with other products refer to, for example, information relating to combination in the case of selling a plurality of products as a set.

"Other service combination information" refers to information that identifies whether a product specified with a "product code" is a product incorporated in a special service-that allows a beverage to be ordered free of charge when the total amount of the order exceeds XX yen. "Specific processing information." refer to information that defines specific processing for a limited period of time such as reducing the price of a product specified with a "product code" by half or providing at no extra charge to Set A for only a certain period of time defined in "processing period information". "Product image information" refers to information relating to image data of the product specified with the "product code". "Availability" refers to information relating to the time period during which the product specified with the "product code" is sold. "Attributes information" refers to the following information relating to attributes of the product specified with the "product code". "Category information" refers to information relating to the category (such as Japanese-style food, Western-style food, dessert or beverage) of the product specified with the "product code". "Priority information" refer to information that is set as to whether the product is a product that is to be sold preferentially at the restaurant. Other "attributes information" includes the number of people that are dining. Furthermore, various information may also be managed with dedicated databases, such as managing "product image information" with a dedicated database.

Next, an explanation is provided of inventory information database 132b with reference to the drawings.

Figure 16B:
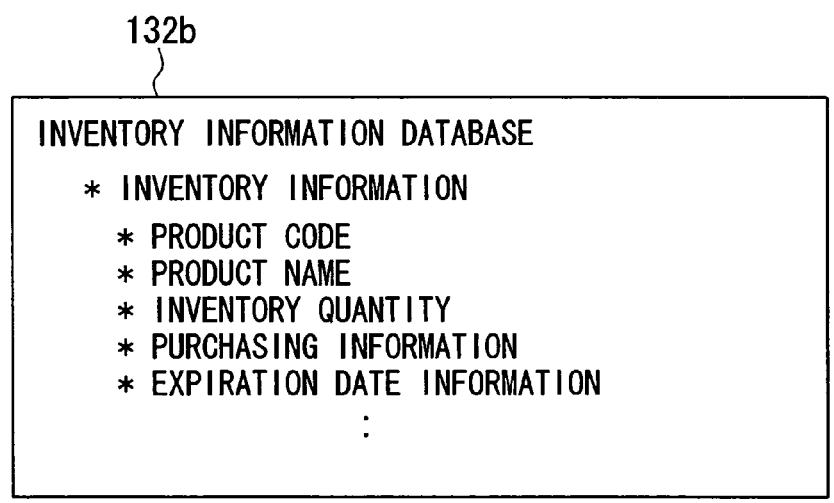

FIG. 16B is a drawing showing an example of the constitution of inventory information database 132b equipped in product order management device 12 in a second embodiment of the present invention. As shown in the drawing, the following information is stored as "inventory information". "Product code" refers to an identifier that specifies a product. "Product name" refers to the name of the product specified with the "product code". "Inventory quantity" refers to information relating to the inventory quantity of the product specified with the "product code". "Purchasing information" refers to information relating to the date and time on which the product specified with the "product code" was purchased and the price at which it was purchased. In addition, "purchasing information" includes information on the average purchasing price that is the average of the purchasing prices during a predetermined previous time period. "Expiration date information" refers to information relating to the expiration date of a product that is calculated based on the purchasing date and time of the "purchasing information" and the allowable storage period (allowable usage period) of each product.

Next, an explanation is provided of terminal information database 132c with reference to the drawings.

Figure 17A:
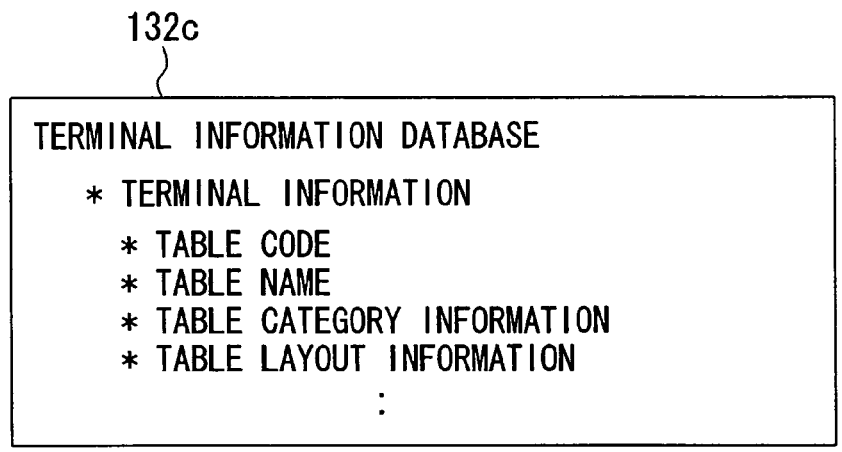
FIG. 17A and FIG. 17B are drawings showing an example of the constitution of a terminal information database 132c and an order information database 132d equipped in a product order management device 12 in a second embodiment of the present invention.

FIG. 17A is a drawing showing an example of the constitution of terminal information database 132c equipped in product order management device 12 in a second embodiment of the present invention. As shown in the drawing, the following information is stored as "terminal information".

"Table code" refers to an identifier that specifies a table and the ordering terminal 10 installed at the table. "Table name" refers to the unique name of each table given by an employee for identifying each table. Furthermore, "table code" and "table name" may be assigned by dividing a counter at arbitrary intervals if the table is in the form of a counter.

In addition, "table category information" refers to information relating to the category of the table specified with the "table code" (counter, round table, low table, etc.), equipment information (information relating to the installed ordering terminal, information as to whether or not the table has a grilling plate, etc.) and whether the table is a smoking table or non-smoking table. "Table layout information" refers to information relating to the installed location of the table specified with the "table code". As has been indicated above, since one ordering terminal 10 corresponds to one table, terminal information database 132c also stores information relating to each table as information relating to ordering terminal 10.

Next, an explanation is provided of order information database 132d with reference to the drawings.

Figure 17B:
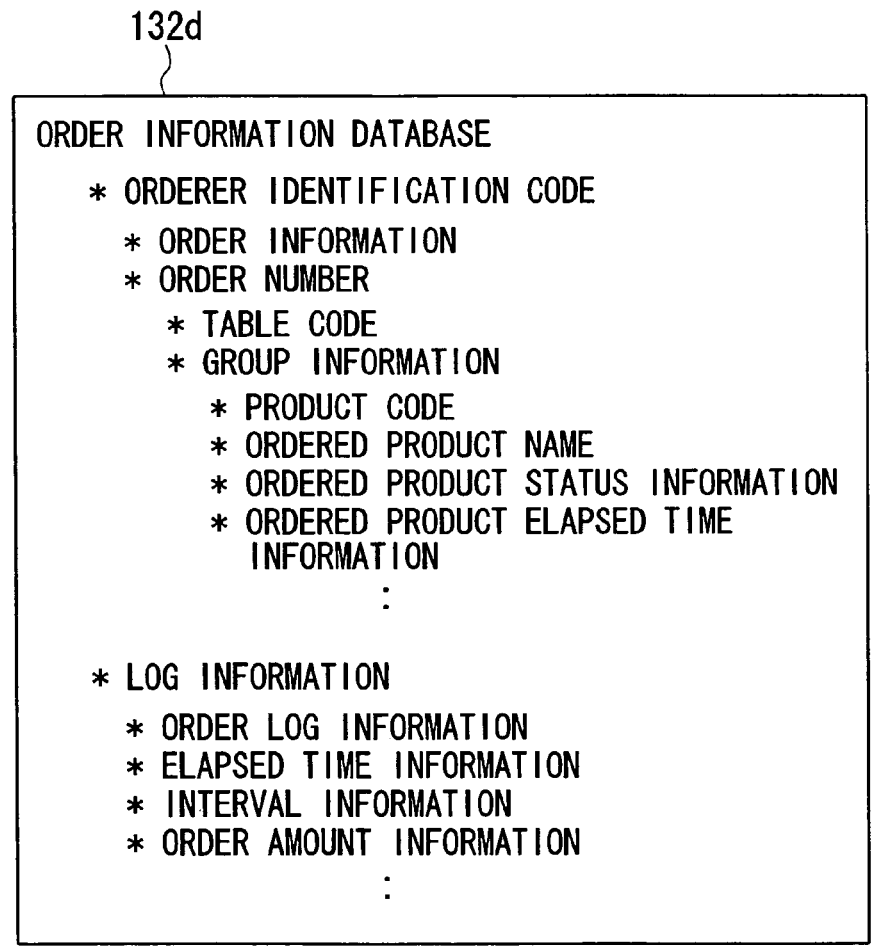

FIG. 17B is a drawing showing an example of the constitution of order information database 132d equipped in product order management device 12 in a second embodiment of the present invention. As shown in the drawing, the information shown below is stored as "order information" by correlating with an "orderer identification code" that specifies an orderer who has placed an order. "Order number" refers to a number arbitrarily assigned by order information management section 134 for specifying an order. "Table code" refers to an identifier that specifies the table where the orderer is setting who is specified with the "orderer identification code". "Group information" refers to information that includes a group ID that identifies a group in the case the orderer specified with the "orderer identification code" is categorized as a separately billed group.

"Product code" refers to an identifier that specifies a product ordered in the order specified with the "order number". "Ordered product name" is the name of the ordered product specified with the "product code". "Ordered product status information" refers to information that indicates the status (before cooking, currently cooking, cooked, served, etc.) of the ordered product specified with the "order number" and "product code". "Ordered product elapsed time information" refers to information that indicates the elapsed time since an order has been placed for the product specified with the "order number" and the "product code".

"Log information" includes the following information in the form of log information for a series of orders placed by an orderer specified with a "orderer identification code". "Order log information" refers to information relating to a log of a series of orders made by an orderer specified with an "orderer identification code". "Elapsed time information" refers to information relating to the time that has elapsed from the start of a series of orders placed by an orderer specified with an "orderer identification code". "Interval information" refers to information relating to the interval of a series of orders placed by an orderer specified with an "orderer identification code". "Order amount information" refers to information relating to the total monetary amount of products from a series of orders placed by an orderer specified with an "orderer identification code". As has been indicated above, order information database 132d stores order information relating to ordered products.

Next, an explanation is provided of restaurant and facility information database 132e with reference to the drawings.

Figure 18A:
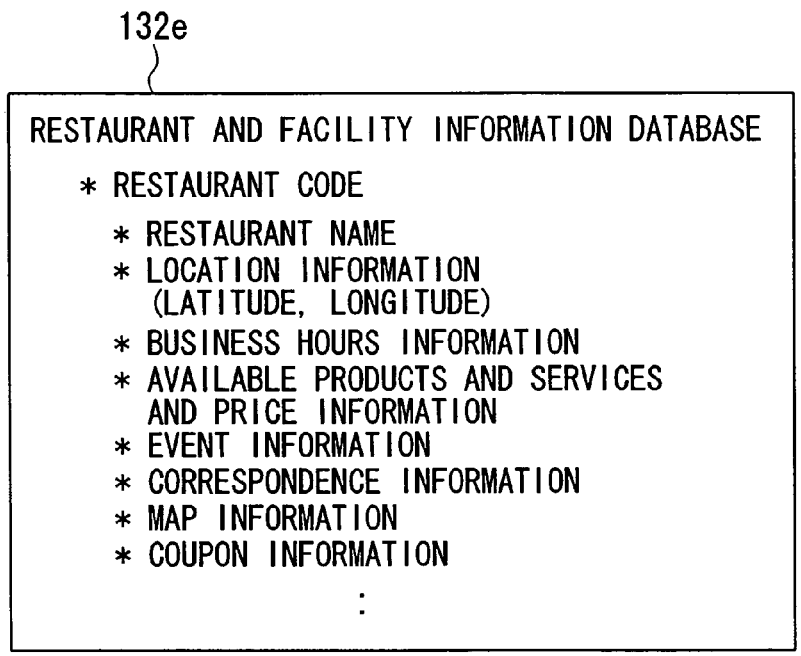
FIG. 18A and FIG. 18B are drawings showing an example of the constitution of a restaurant and facility information database 132e and an orderer information database 132f equipped in a product order management device 12 in a second embodiment of the present invention.

FIG. 18A is a drawing showing an example of the constitution of a restaurant and facility information database 132e equipped in product order management device 12 in a second embodiment of the present invention. As shown in the drawing, the following information relating to restaurants and facilities is stored by correlating with a "restaurant code" that specifies a restaurant or facility. "Restaurant name" refers to a name of a restaurant or facility specified with a "restaurant code". "Location information" refers to information relating to the location of a restaurant or facility specified according to latitude and longitude. "Business hours information" refers to information relating to the business hours (or usage times) and holidays of a restaurant and facility specified with a "restaurant code".

"Available products and services and price information" includes information relating to products or services offered at a restaurant or facility specified with a "restaurant code" (including price information). "Event information" refers to information relating to special events held at a restaurant or facility specified with a "restaurant code". "Correspondence information" refers to information relating to the telephone number, facsimile number, E-mail address and other correspondence information of a restaurant or facility specified with a "restaurant code". "Map information" refers to information relating to a map of the area surrounding a restaurant or facility specified with a "restaurant code". "Coupon information" refers to discount information relating to coupons and so forth that can be used at a restaurant or facility specified with a "restaurant code".

Next, an explanation is provided of orderer information database 132f with reference to the drawings.

Figure 18B:
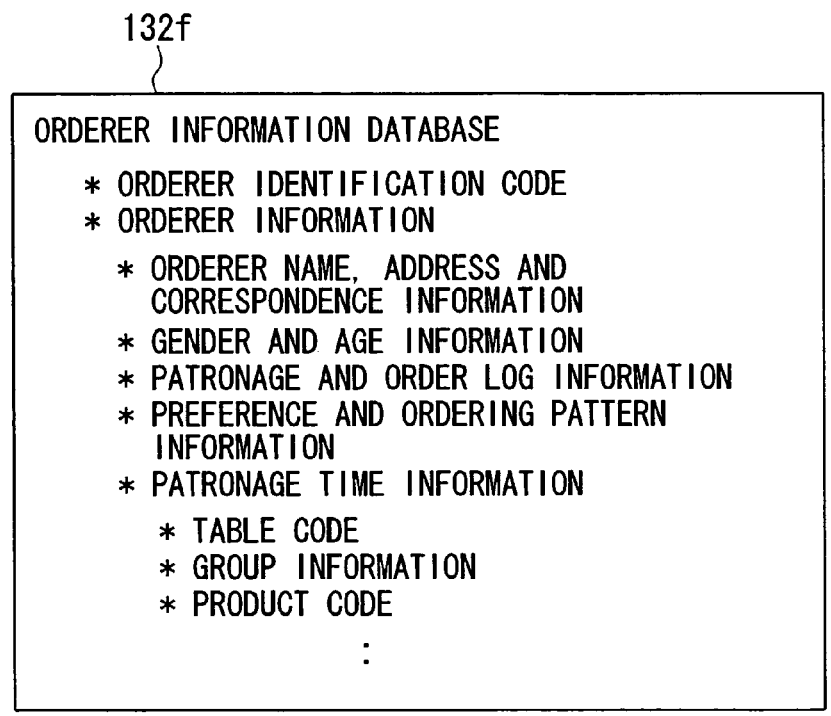

FIG. 18B is a drawing showing an example of the constitution of a orderer information database 132f equipped in product order management device 12 in a second embodiment of the present invention. As shown in the drawing, the following information is stored as "orderer information" in the form of information relating to an orderer by correlating with an "orderer identification code" that specifies an orderer who has placed an order. "Orderer name, address and correspondence information" refers to information relating to the name, address and correspondence of an orderer specified with an "orderer identification code". "Gender and age information" refers to information relating to the gender and age of an orderer specified with an "orderer identification code".

"Patronage and order log information" refers to information relating to a log of patronage of the restaurant in the past by an orderer specified with an "orderer identification code" and a log relating to the products ordered when that orderer patronized the restaurant. "Preference and ordering pattern information" refers to preferred products and frequently used ordering patterns of an orderer that have been extracted from "patronage and order log information". "Patronage time information" refers to information for which the following information is stored that is accumulated on a real-time basis when an orderer specified with an "orderer identification code" patronized the restaurant. "Table code" refers to an identifier that identifies the table where the customer sat. "Group information" refers to information that specifies a group in the case the orderer is a group customer. "Product code" is an identifier that specifies products ordered by an orderer.

Here, the explanation returns to the internal constitution of product order management device 12. Reference symbol 133 indicates a product information generation section that generates product display field 72 (presented product information) contained in product ordering screen 70 (presented information) shown in FIG. 11 to display section 23 of ordering terminal 10 by referring to product information from product information database 132a. Reference symbol 134 indicates an order information management section that manages order information acquired by ordering terminal 10 by correlating with an orderer identification code acquired by identification information processing section 26 equipped in ordering terminal 10. Reference symbol 135 indicates a presented information control section that changes at arbitrary times the contents of product ordering screen 70 (product display field 72) presented by display section 23 by controlling product information generation section 133. Furthermore, the screen on which presented information control section 135 changes the contents is not limited to product ordering screen 70, but rather the contents of various screens presented to display section 23 may also be changed.

Furthermore, although product ordering screen 70 is generated by product information generation section 133, presented information control section 135 and screen control section 24 within ordering terminal 10, the division of processing that generates product ordering screen 70 based on various information may be arbitrarily determined in consideration of the communication capacity, processing capacity and so forth of product order management device 12 and ordering terminal 10. In addition, although not shown in the drawings, order information management section 134 is equipped with a temporary order information storage section that stores order information at the stage it has been selected prior to pressing "finalize order button" 78, which finalizes an order confirmed in order confirmation field 77 of product ordering screen 70', in the form of temporary order information.

Reference symbol 136 indicates an inventory information referral processing section that prevents products for which there is no inventory from being selected on product ordering screen 70 based on inventory information referred to from inventory information database 132b when product information generation section 133 generates product display field 72 for product ordering screen 70. In addition, even when presented information control section 135 has changed the contents of product ordering screen 70, inventory information referral processing section 136 requests presented information control section 35 to preferentially present products that tend to be overstocked. In addition, presented information control section 135 preferentially presents products for which there is a high priority by referring to "priority information" in the form of information on products preferentially offered by the restaurant from product information database 132a. Reference symbol 137 indicates a seating information management section that manages seating information including information that correlates the table where ordering terminal 10 is installed, the table code that identifies ordering terminal 10, and the orderer identification code of the orderer seated at the table.

Here, an explanation is provided of an embodiment with respect to the internal constitution of seating information management section 137.

Figure 15:
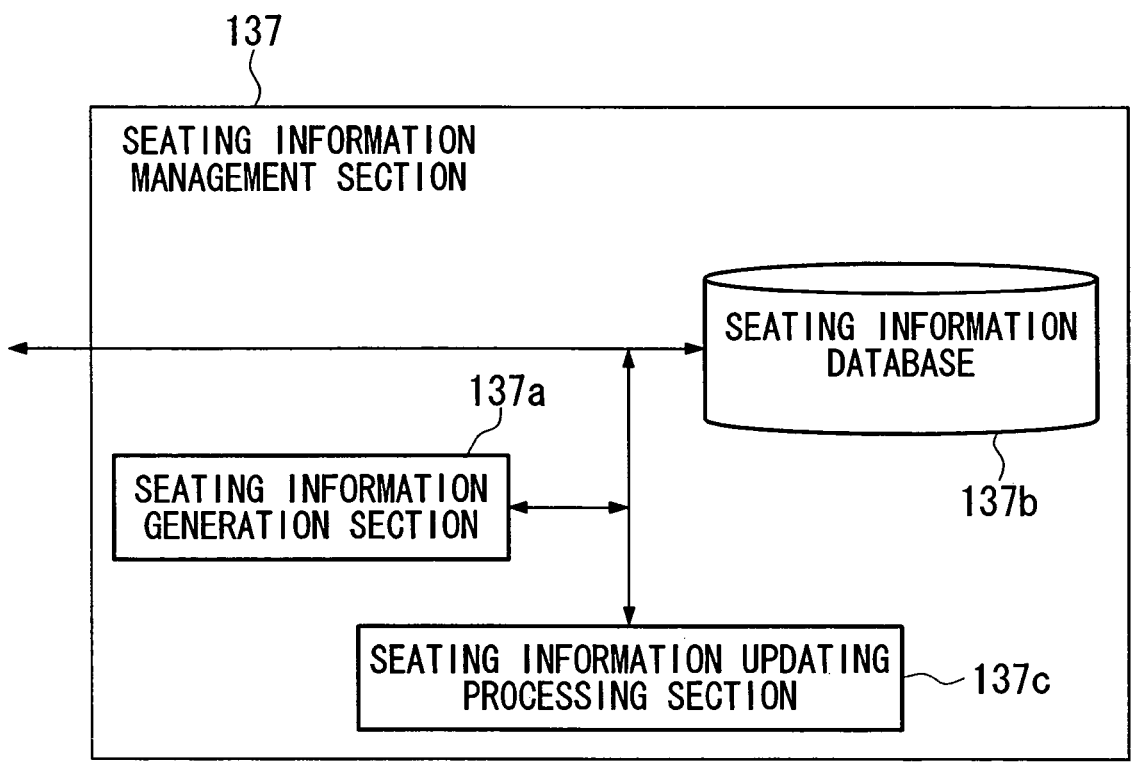
FIG. 15 is a block drawing showing the internal constitution of a seating information management section 137 equipped in a product order management device 12 in a second embodiment of the present invention.

FIG. 15 is a block diagram showing the internal constitution of seating information management section 137 equipped in product order management device 12 in a second embodiment of the present invention. In the drawing, reference symbol 137a indicates a seating information generation section that generates seating information that correlates the table code of a table and the orderer identification code whenever the identification information acquisition processing section 26 of ordering terminal 10 installed at the table acquires an orderer identification code. Reference symbol 137b indicates a seating information database that stores seating information that correlates table codes and orderer identification codes.

Next, an explanation is provided of an example of the constitution of seating information database 137b with reference to the drawings.

FIG. 5C is a drawing showing an example of the constitution of seating information database 137b equipped in product order management device 12 in an embodiment of the present invention. As shown in the drawing, the following information is stored as "seating information". "Table code" refers to an identifier that specifies a table. "Orderer identification code" refers to information that specifies the orderer currently seated at the table specified with the "table code". Furthermore, when there is no one sitting at the table specified with the "table code", "NULL" is stored for the "orderer identification code". Namely, when searching for an empty table, a "table code" should be searched for in which the "orderer identification code" is "NULL".

"Seating information generation time" refers to information relating to the time and date at which seating information generation section 137a generated "seating information" correlated with the "table code" and "orderer identification code". In addition, "group information" and "order information" are as previously described. "Seating log information" refers to log information of past seating information that has been updated by movement of an orderer to a different table in the case the orderer specified with the "orderer identification code" has moved to a different table. As has been indicated above, seating information database 137b stores information relating to seating that also includes information relating to empty seats as "seating information".

Reference symbol 137c indicates a seating information updating processing section that updates to the latest seating information based on "seating information generation time" in the case there is a plurality of seating information that contains the same orderer identification code. Furthermore, seating information updating processing section 137c stores seating information that is not the latest seating information stored in seating information database 137b as "seating log information" in seating information database 137b. As has been indicated above, seating information management section 137 manages the latest seating information as well as a log of past seating information.

Reference symbol 138 indicates a status information evaluation processing section that evaluates status information in the form of information relating the ordering status of an orderer (e.g., waiting for an order, currently eating appetizer, currently eating main course, currently eating dessert) by referring to "order log information", "elapsed time information", "interval information" and "order amount information" from order information database 132d. Furthermore, presented information control section 135 changes the contents of product ordering screen 70 corresponding to the status information evaluated by status information evaluation processing section 138. Reference symbol 139 indicates a current time and date information providing section that provides current time and date information in the form of time and date information relating to the current season, year, month and date, day of the week and time. Furthermore, presented information control section 135 changes the contents of product ordering screen 70 in reflection of processing defined for searched "specific processing information" by searching for "specific processing information", which includes "processing period information" that the "current time and date information" provided by current time and date information supplying section 139 is within that period, from product information database 132a.

Reference symbol 13A indicates a search processing section that searches restaurant and facility information database 132e for surrounding area information in the form of information relating to other restaurants and facilities in the vicinity of a restaurant based on the location information of the restaurant where ordering terminal 10 is installed. Furthermore, presented information control section 135 is able to make the surrounding area information searched for by search processing section 13A on product ordering screen 70 and various other screens. Reference symbol 13B indicates a serving instructions information generation section that generates serving instructions information for presenting service instructions to serving instructions device 14 by referring to "seating information" at the time cooking is completed from seating information database 137b based on the orderer identification code correlated with "order information" of the food for which cooking has been completed.

Reference symbol 13C indicates a cooking instructions information generation section that generates cooking instructions information for presenting cooking instructions to cooking instructions device 13 based on "order information" managed by order information management section 134. Reference symbol 13D indicates a billing information output section that collectively outputs "order information" correlated with the orderer identification code or "order information" correlated with "group information" in the form of billing information in response to a request from billing processing system 15.

Furthermore, in the case the total amount of an order is equal to or greater than a predetermined amount as a result of placing an additional order as determined by referring to "order amount information" from order information database 132d, presented information control section 135 is able to present to display section 23 product ordering screen 70 that includes total service amount information in the form of information relating to services provided to the orderer. In addition, presented information control section 135 is able to present to display section 23 product ordering screen 70 that contains information relating to the preferential products of an orderer using "product information" referred to based on the orderer identification code from orderer information database 132f.

As has been shown above, product order management device 12 manages "order information" and promotes sales of products by suitably changing information presented to display section 23 of ordering terminal 10 using information for managing that order.

Furthermore, ordering terminal 10 is not limited to a form equipped with user identification processing section 10a, but rather may be of a form in which a user identification processor and so forth is provided separately, and ordering terminal 10 is connected with the user identification processor In addition, although the description of the aforementioned embodiment was presented with respect to order management including cooking and preparation of foods and beverages in response to orders for foods and beverages, the present embodiment is not limited to this, but rather may also be an embodiment in which the aforementioned "foods and beverages" are replaced with "various products", and the aforementioned "cooking and preparation" is replaced with "preparations for providing products".

In addition, in the aforementioned embodiment, although a magnetic card and a scanning device that scans the magnetic card (identification information acquisition processing section 26) are used as a method for acquiring orderer identification codes, the embodiment is not limited to this, but rather various other methods for acquiring information that specifies orderers are suitably used, examples of which include a method that uses an IC card containing a recording medium that allows non-contact scanning and writing of information and a scanning device that scans the information contained in the IC card, and a method that uses a card imprinted with a bar code and a scanning device that scans the bar code.

In addition, each of the aforementioned processing sections shown in FIGS. 2, 14 and 15 may also be realized with dedicated hardware, or each processing section may be composed with memory and CPU (central processing unit), and its function may be realized by loading a program for realizing the function of each processing section into memory and running that program.

In addition, the aforementioned memory may be composed of a recording medium that can be read and written by a computer using a hard disk device, magnetooptical disk device, non-volatile memory such as flash memory, CD-ROM or other read-only recording medium, volatile memory like random access memory (RAM) or a combination thereof.

Next, an explanation is provided of the operation of the aforementioned sales promotion system.

Figure 19:
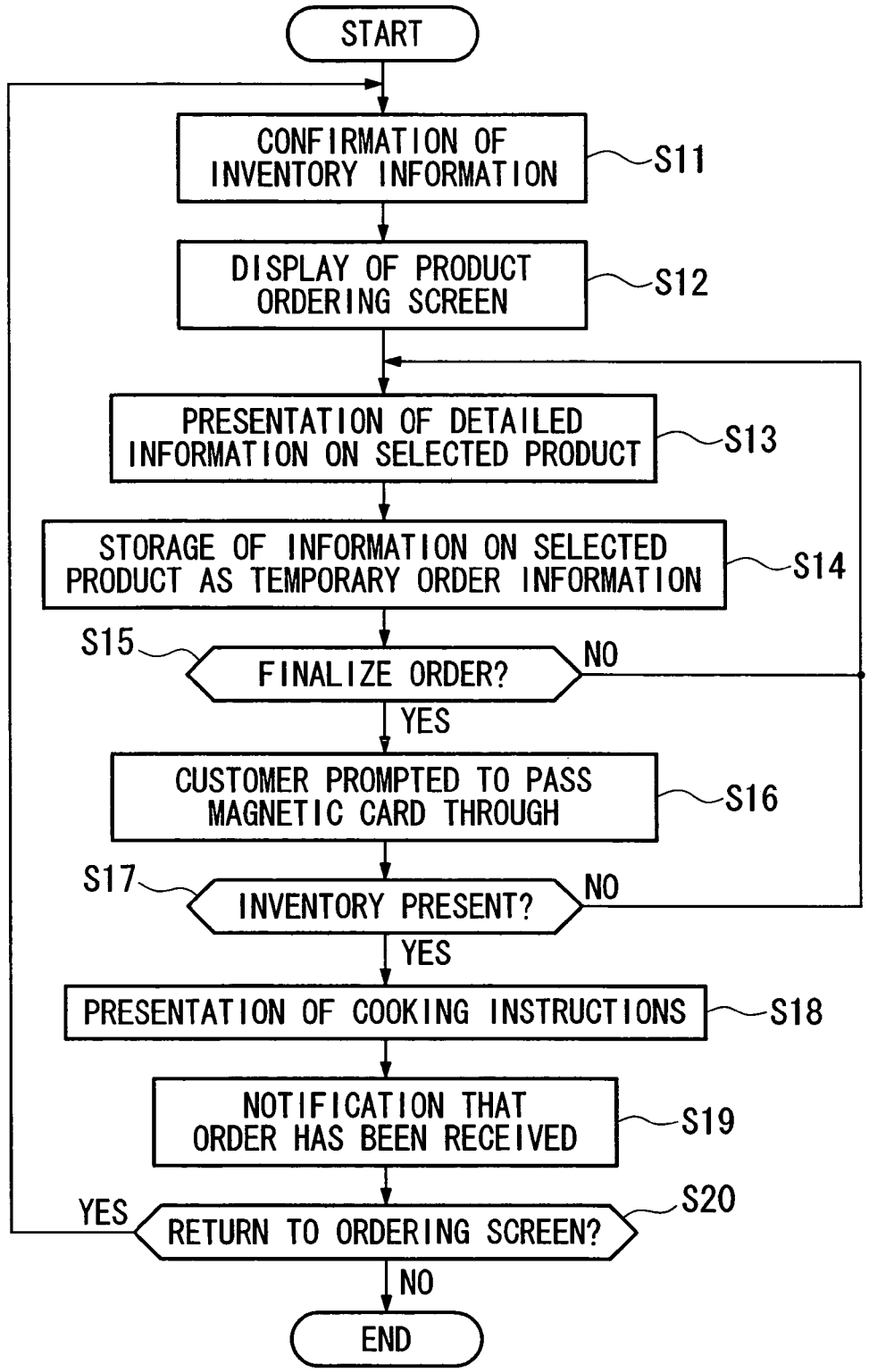
FIG. 19 is a flow chart showing the operation by which a sales promotion system in a second embodiment of the present invention promotes sales of products using an ordering terminal 10 during the course of managing product orders.

FIG. 19 is a flow chart showing the operation of performing sales promotion of products using an ordering terminal 10 during the course of managing product orders by a sales promotion system in an embodiment of the present invention. Here, a customer is assumed to have a magnetic card on which is recorded an orderer identification code that specifies the customer as an ordere. Furthermore, a predetermined number of magnetic cards may be produced in advance, or the sales promotion system may be additionally equipped with a magnetic card production device, and magnetic cards containing orderer identification codes may be produced using that magnetic card production device.

Next, the customer sits at a table, and passes the magnetic card that has been given out through identification information acquisition processing section 26 of ordering terminal 10 installed at the table. As a result, identification information acquisition processing section 26 acquires the orderer identification code that specifies the customer, and usage restriction section 27 of ordering terminal 10 allows the use of ordering terminal 10. Next, a request for product information containing the orderer identification code acquired by ordering terminal 10 is transmitted to product order management device 12. As a result of transmission and reception processing section 131 of product order management device 12 receiving that request, inventory information referral processing section 136 confirms inventory by referring to inventory information database 132b for "inventory information" of products scheduled to be displayed on product ordering screen 70 (Step S11).

Next, presented information control section 135 generates product display field 72 that contains product information to be contained in product ordering screen 70 by specifying a preferential product of the orderer from "orderer information" referred to from orderer information database 132f based on the orderer information code, controlling product information generation section 133 and referring to product information of the product specified from product information database 132a. Furthermore, the product information made to be contained in product ordering screen 70 by presented information control section 135 at this time is product information for which inventory has been confirmed by inventory information referral processing section 136. Next, transmission and reception processing section 131 transmits product display field 72 generated by product information generation section 133 to ordering terminal 10. As a result, transmission and reception processing section 21 of ordering terminal 10 receives that product display field 72.

Next, screen control section 24 presents product ordering screen 70 to display section 23 based on the received product display field 72 and "ordering screen information" referred to from screen information database 22a (Step S12). As has been indicated above, a product ordering screen 70 that reflects the preferences of an orderer can be presented to display section 23 as a result of being controlled by presented information control section 135.

In addition, separate from the processing of inventory information referral processing section 136, during generation of screen information for product ordering screen 70 by product information generation section 133, those products among the products displayed on product ordering screen 70 for which there is no inventory may be made to not be able to be selected based on inventory information referred to from inventory information database 132b. As a result, a situation that may cause the customer to have an unfavorable impression of the establishment can be avoided since the customer will be able to ascertain that the product is out of stock after ordering. In addition, inventory information referral processing section 136 requests presented information control section 135 to preferentially present products that tend to be overstocked. As a result, presented information control section 135 controls presented information so that products preferred to by the order which tend to be overstocked are presented to product ordering screen 70 with the highest priority.

Furthermore, an employee performs grouping processing as necessary when a customer sits at a table. At this time, group information input section 28 presents to display section 23 the grouping screen 85 shown in FIG. 13B on which group information is input by correlating a plurality of orderer identification codes with a group ID that specifies separately billed groups. At this time, presented information control section 135 is able to present product information to display section 23 by placing priority on those products preferred to by groups (for large numbers of people) by referring to "orderer information", or by placing priority on products for which the preferences of each orderer overlap the most by referring to "orderer information".

Next, when the customer touches a product name in order confirmation field 77, screen control section 24 presents product group detailed information screen 80 to display section 23 (Step S13). Next, in the case a product has been selected on product group detailed information screen 80 presented to ordering terminal 10, screen control section 24 presents product ordering screen 70' to ordering terminal 10, and displays a list of selected products in order confirmation field 77. At this time, order information management section 134 stores information relating to the selected products in a temporary order information storage section in the form of temporarily order information (Step S14).

Here, in the case the customer decides to order a selected product (Yes in Step S15), the order is finalized on ordering terminal 10 as a result of pressing "finalize order button" 78 of product ordering screen 70' or by pressing "finalize order button" 82 of product group detailed information screen 80. In addition, in the case the customer decides not to order a selected product (No in Step S15), the processing returns to Step S13. Furthermore, the timing by which screen control section 24 presents product group detailed information screen 80 to ordering terminal 10 is not limited to that described above, but rather product group detailed information screen

80 may be presented on various screens in the case the customer has touched a product name.

Next, screen control section 24 presents to display section 23 a screen that prompts the customer to pass the magnetic card through identification information acquisition processing section 26 in order to finalize the order (Step S16). Here, when the magnetic card is passed through, inventory information referral processing section 136 searches for the presence of inventory of the products contained in "order information" by referring to inventory information database 132b. Here, in the case there is inventory of a desired product (Yes in Step S17), the processing proceeds to Step S18. In addition, if there is no inventory for the desired product (No in Step S17), ordering terminal 10 is notified to that effect and the processing returns to Step S13.

Next, cooking instructions information generation section 13C generates cooking instructions information for providing cooking instructions to cooking instructions device 13 based on "order information" managed by order information management section 134. Next, cooking instructions device 13 receives the generated cooking instructions information and presents cooking instructions screen 50 (Step S18). Next, ordering terminal 10 is notified to the effect that the aforementioned order has been received (Step S19). Next, product order information management device 12 prompts the orderer to select "return to product ordering screen 70" or "display another screen". Here, in the case "display another screen" is selected (NO in Step S20), product order management device 12 presents product ordering screen 70 and terminates processing for acquiring order information.

In addition, in the case "return to product ordering screen 70" has been selected (YES in Step S20), processing returns to Step S11, and inventory information referral processing section 136 confirms inventory by referring to "inventory information" for the products scheduled to be displayed on product ordering screen 70 from inventory information database 132b. Next, presented information control section 135 displays on display section 23 product ordering screen 70 that reflects information to ordered products by referring to "order log information" (Step S12). Subsequently, the processing from Step S13 through S20 is repeated whenever an order is placed. In addition, during the time an order is not placed as well, presented information control section 135 updates product ordering screen 70 as necessary based on "status information" assessed by status information evaluation processing section 138. As a result of the aforementioned processing, the sales promotion system of the present invention is able to promote sales of products by presenting product ordering screen 70 corresponding to the order status of a customer.

In addition, in the case cooking according to the cooking instructions has been completed, serving instructions information generation section 13B generates serving instructions information for providing serving instructions to serving instructions device 14 by referring to "seating information" at the time cooking is completed from seating information database 137b based on an orderer identification code correlated to the "order information" of the food or beverage on which cooking or preparation has been completed. Next, serving instructions device 14 receives serving instructions information and presents serving instructions screen 60. This information is also used for the processing of status information evaluation processing section 138.

As has been described above, the sales promotion system in the present embodiment is able to present product ordering screen 70 that promotes sales of products to display section 23 of ordering terminal 10. In addition, this sales promotion system is able to manage "order information" by correlating with an orderer identification code in the case a product is ordered from ordering terminal 10.

Next, an explanation is provided of another embodiment of the present invention in the case of promoting products on a standby screen during times when ordering terminal 10 is not being operated by a customer.

At this time, presented information control section 135 generates advertised product information for a product promotional screen that contains product information on specified products preferred by an orderer from "orderer information" referred to from orderer information database 132f based on the orderer identification code. Next, transmission and reception processing section 131 transmits advertised product information generated by product information generation section 131 to ordering terminal 10. As a result, transmission and reception processing section 21 of ordering terminal 10 receives the advertised product information. Next, screen control section 24 of ordering terminal 10 presents a product promotional screen for introducing and advertising products that contains the advertised product information received from product order management device 12 by referring to "standby screen information" from screen information database 22a.

Furthermore, the timing by which screen control section 24 presents the product promotional screen to ordering terminal 10, and the timing by which it changes the presented contents (product information), may be arbitrary. In addition, product order management device 12 presents product ordering screen 70' for ordering a product to ordering terminal 10 in the case the customer has touched a product image or product name on the product promotional screen. In addition, in the case a product presented to the aforementioned product promotional screen is a product that is not sold or cannot be ordered at the restaurant, product order management device 12 presents detailed information on the product, coupon information and so forth to display section 23 of ordering terminal 10 when the customer has touched the product image or product name of the product.

In addition, although the aforementioned embodiment has indicated the form in which presented information control section 135 changes products presented to ordering terminal 10 by controlling product information generation section 133, the present embodiment is not limited to this, but rather a form may be employed in which products presented to ordering terminal 10 are of the same type but for which the prices of the products are changed corresponding to the time period and customer (in the case of employing a membership system). In addition, at restaurants combining the use of an ordering method by which orders are placed from ordering terminal 10 and a conventional ordering method by which orders are placed by calling an employee, the use of ordering terminal 10 can be expected to be promoted by product order management device 12 providing prices discounted by a predetermined percentage to customers who place orders from ordering terminal 10.

In addition, a program for realizing the functions of the processing sections performing the various processing in FIGS. 2, 14 and 15 may be recorded onto a computer-readable recording medium, and a program recorded on that recording medium may be read by a computer server, and that program may then be executed to carry out the various processing. Furthermore, the "computer server" referred to here includes an OS and hardware such as peripheral equipment.

In addition, a "computer server" also includes a web site service environment (or display environment) in the case of using a WWW server.

In addition, a "computer-readable recording medium" refers to a portable medium such as a flexible disk, magnetooptical disk, ROM or CD-ROM and so forth, or a storage device such as a hard disk contained in a computer server. Moreover, a "computer-readable recording medium" includes a medium that retains a program for a fixed period of time in the manner of volatile memory (RAM) inside a computer server serving as a server or client in the case a program is transmitted via a network such as the Internet or a communication line such as a telephone line.

In addition, the aforementioned program may be transferred to another computer server from the computer server in which it is stored in a storage device and so forth via a transfer medium or by transfer waves within a transfer medium. Here, the "transfer medium" that transfers the program refers to a medium having the function of transferring information in the manner of a network (communication network) such as the Internet or a communication line such as a telephone line.

In addition, the aforementioned program may also be that for realizing a portion of the aforementioned function. Moreover, it may also be that which is capable of realizing the aforementioned function by combining with a program already recorded in a computer server, namely a so-called differential file (differential program).

In addition, according to the present invention, since a product information database, which stores product information in the form of information relating to a product or service, and a product information generation unit, which generates presented product information contained in presented information by referring to product information from the product information database, are additionally provided, and a presented information control unit changes the contents of presented information by controlling the product information generation unit, presented product information contained in product information can be generated by referring to product information from the product information database.

In addition, according to the present invention, since a status information evaluation unit is additionally provided that evaluates status information in the form of information relating to the order status of an orderer by referring to one or a plurality of order log information in the form of a log of orders according to orderer acquired by the aforementioned ordering terminal, elapsed time information in the form of information on elapsed time after an order has been started by an orderer, interval information in the form of information relating to the interval between the time of each order in the case a plurality of orders have been placed by an orderer, and order amount information in the form of information relating to the total monetary amount as determined from the orders placed by each orderer, and a presented information control unit changes the contents of presented information corresponding to the status information evaluated by the status information evaluation unit, the contents of presented information can be changed corresponding to status information in the form of information relating to the order status of an orderer such as ordering a drink, ordering food or finished serving drink and so forth.

As a result, presented information can be changed so as to contain information relating to drinks at times when a drink is likely to be ordered by referring to the intervals at which drinks were ordered in the past. In addition, presented information can be changed so as to contain information relating to after-dinner drinks such as coffee by evaluating that the orderer will soon be finished eating if the order interval has increased.

In addition, according to the present invention, since product information stored in the aforementioned product information database includes processing period information in the form of a period limited by time and date information that contains one or a plurality of the season, year, month and date, day of the week and time, and additionally includes specific processing information that defines specific processing for the period specified with processing time information, a current time and date information providing unit is additionally provided that provides current time and date information in the form of time and date information at the current point in time, and a presented information control unit is additionally provided with a function that searches a product information database for specific processing information that contains processing period information for which the current time and date information provided by the current time and date information providing unit is within the time period, and changes the contents of the presented information in reflection of the processing defined by the specific processing information that has been searched, the contents of presented information can be changed corresponding to specific services offered for a limited time period according to season, year, month and date, day of the week or time.

As a result, services offered for a limited time period can be conveyed to orderers more effectively.

In addition, according to the present invention, since the aforementioned presented information control unit is additionally provided with a function that includes total amount added service information, in the form of information relating to added services such as free items offered to an orderer, in presented information based on order amount information and in the case an additional order is placed and the total monetary amount of the order is equal to or greater than a predetermined amount, in the case the total monetary amount of an order is equal to or greater than a predetermined amount, the contents of presented information can be changed corresponding to total amount free services in the form of offering certain products free of charge.

As a result, orderers can be made aware of the existence of total amount added services, and orderers can be prompted to place additional orders in order to utilize these total amount added services.

In addition, according to the present invention, as a result of additionally being equipped with a restaurant and facility information database, which stores restaurant and facility information in the form of information relating to the restaurant and facility, including location information on various restaurants and facilities, and a searching unit that searches that restaurant and facility information database for surrounding area information in the form of information relating to other restaurants and facilities in the vicinity of the restaurant based on the location information of the restaurant where ordering terminal 10 is installed, and since a presented information control unit is additionally equipped with a function that includes surrounding area information found by the searching unit in the presented information, a search can be made for surrounding area information in the form of information relating to other restaurants and facilities in the vicinity of the restaurant, and presented information can be presented that contains the resulting surrounding area information.

As a result, the next destination can be introduced to customers that have the potential for staying for a long period of time as a result of wondering where to go next. Namely, customers can be prompted to begin moving to their next destination without staying for an excessively long period of time. As a result, customer turnover rate can be improved.

In addition, according to the present invention, since the searching unit preferentially searches for other restaurants and facilities close to a restaurant based on location information on the restaurant where the ordering terminal is installed, information relating to other restaurants and facilities closer to the restaurant can be preferentially included in presented information.

In addition, according to the present invention, as a result of being additionally equipped with an orderer information database which stores order information that at least includes a past order log of the orderer by correlating with orderer identification information that identifies orderers, and a presented information control unit changes the contents of presented information by using orderer information referred to from the orderer information database based on orderer identification information, presented information can be presented that contains products preferred by the orderer that have been extracted from the past order log.

As a result, various information such as orderer preferences and ordering patterns can be extracted from the past order log, and presented information can be presented that reflects this extracted information.

The invention claimed is:

1. A product ordering system comprising:
    a plurality of ordering terminals installed on tables which acquire order information by prompting an orderer to select and order desired products or services;
    an identification information acquisition section, provided in each ordering terminal, that acquires orderer identification information that identifies the orderer;
    an order information management section that manages order information acquired from the ordering terminals by correlating with orderer identification information acquired by the identification information acquisition section equipped on the ordering terminals; and
    a seating information management section which manages seating information that contains table identification information that identifies the tables and the ordering terminals, and information correlated with the orderer identification information of the orderer which is seated at one of the tables, the seating information management section comprising,
        a seating information generation section that generates seating information that correlates the table identification information of the table at which the orderer is seated and the orderer identification information when the identification information acquisition section of the ordering terminal installed at the table acquires the orderer identification information,
        a seating information database that stores at least the seating information by correlating with generation time in the form of information on a date and time at which the seating information was generated and that stores seating log information which refers to log information of past seating information that has been updated by movement of the orderer to a different table when the orderer specified with the orderer identification code has been moved to a different table, and
        a seating information updating section that updates the seating information to a most recent seating information based on the generation time when there is a plurality of seating information containing the same orderer identification information in a seating information database.

2. The product ordering system according to claim 1, further comprising:
    an inventory information database that stores product inventory information or service availability information as information as to whether or not a service can be provided by correlating with a product identifier that specifies a product or service; and
    an inventory information referral section, provided in each ordering terminal, that prevents products for which there is no inventory or services that cannot be provided from being selected based on inventory information or service availability information referred to from the inventory information database when prompting the orderer to select a desired product or service.

3. The product ordering system according to claim 1, wherein the ordering tenninals further comprising a usage restriction unit section that allows usage of an ordering terminal after the identification information acquisition processing section has acquired the orderer identification information.

4. The product ordering system according to claim 1, wherein the order information management section manages order information of foods and beverages acquired by an ordering terminal by correlating with the orderer identification information in the case a product has been cooked after receiving an order, and
    the product ordering system further comprising:
        a cooking instructions section that presents cooking instructions for the foods or beverages to a food preparer; and
        a cooking instructions information generation section that generates cooking instructions information for presenting cooking instructions to the cooking instructions section based on the order information managed by the order information management section.

5. The product ordering system according to claim 4, further comprising a cooking completion input section that allows input of the completion of the cooking of a food or beverage in the case cooking of the food or beverage has been completed according to the cooking instructions of the cooking instructions section.

6. The product ordering system according to claim 1, further comprising:
    a serving instructions section that presents serving instructions so that a food or beverage for which cooking has been completed is served to the table where the orderer is seated; and
    a serving instructions information generation section that generates serving instructions information for presenting serving instructions to the serving instructions section by referring to the seating information at the time cooking is completed from the seating information database based on orderer identification information that is correlated with order information of the food or beverage for which cooking has been completed.

7. The product ordering system according to claim 1, wherein the order information management section manages the order information by correlating a plurality of orderer identification information with separately billed groups in units of orderers making payment.

8. The product ordering system according to claim 7, wherein the ordering terminals further comprising a group information input section that allows input of group information for correlating a plurality of orderer identification information with separately billed groups.

9. The product ordering system according to claim 1, wherein the order information management section uniquely assigns the orderer identification information to separately billed groups in units of orderers making payment.

10. The product ordering system according to claim 1, further comprising a predicted vacating time calculation seciton that calculates the predicted vacating time of a table at which an orderer is currently sitting by referring to the order status of the orderer and the elapsed time since the orderer sat down at the table based on order information managed in correlation with orderer identification information by the order information management section.

11. The product ordering system according to claim 1, wherein the ordering terminals further comprising an employee call section for enabling the orderer to call an employee that is providing the product or service.

12. The product ordering system according to claim 11, wherein the employee call section comprising a request selection section that prompts selection of a request for which the employee is called.

13. The product ordering system according to claim 1, wherein the ordering terminals further comprising:
  an information presentation section that presents presented information containing presented product information for prompting orderers to select and order products or services; and
  a presented information control section that allows the contents of the presented information presented by the information presentation section to be changed at arbitrary times.

14. A product ordering method in which a plurality of ordering terminals installed on tables are used that acquire order information by prompting an orderer to select and order a desired product or service, comprising:
  a step in which the ordering terminals acquire orderer identification information that identifies the orderer along with the order information; and
  a step in which the order information acquired by the ordering terminals is correlated with the orderer identification information; and
  a step in which seating information is managed, the seating information including table identification information that identifies the tables and the ordering terminals, and information correlated with the orderer identification information of the orderer which is seated at one of the tables, the step in which seating information is managed further comprising,
  generating seating information that correlates the table identification information of the table at which the orderer is seated and the orderer identification information when an identification information acquisition section of the ordering terminal installed at the table acquires the orderer identification information,
  storing at least the seating information by correlating with generation time in the form of information on a date and time at which the seating information was generated,
  storing seating log information which refers to log information of past seating information that has been updated by movement of the orderer to a different table when the orderer specified with the orderer identification (inforamtion) - - code - - has been moved to a different table, and
  updating the seating information to a most recent seating information based on the generation time when there is plurality of seating information containing the same orderer identification information in a seating information database.

15. The product ordering method according to claim 14, comprising an information presentation section that presents presented information to the ordering terminals that contains presented product information for prompting an orderer to select and order a product or service, and the information presentation section allows the contents of the presented information presented by the information presentation section to be changed at arbitrary times.

16. A program -- tangibly embodied in media -- for a product ordering system comprising a plurality of ordering terminals installed on tables which acquire order information by prompting an orderer to select and order desired products or services, -- said program tangibly embodying instructions executable by the computer,-- wherein the program causes a computer to perform:
  a step in which the ordering terminals acquire orderer identification information that identifies the orderer along with the order information; and
  a step in which the order information acquired by the ordering terminals is correlated with the orderer identification information
  a step in which seating information is managed, the seating information including table identification information that identifies the tables and the ordering terminals, and information correlated with the orderer identification information of the orderer which is seated at one of the tables, the step in which seating information is managed further comprising,
  generating seating information that correlates the table identification information of the table at which the orderer is seated and the orderer identification information when an identification information acquisition section of the ordering terminal installed at the table acquires the orderer identification information,
  storing at least the seating information by correlating with generation time in the form of information on a date and time at which the seating information was generated,
  storing seating log information which refers to log information of past seating information that has been updated by movement of the orderer to a different table when the orderer specified with the orderer identification (information) - - code - - has been moved to a different table, and
  updating the seating information to a most recent seating information based on the generation time when there is a plurality of seating information containing the same orderer identification information in a seating information database.

17. The program according to claim 16, wherein the product ordering system comprising an information presentation section that, -- when executed by a computer, -- executes instructions that present presented information to the ordering terminals that contains presented product information for prompting an orderer to select and order a product or service, and
  the program -- further contains executable instructions that cause a computer to perform -- processing that allows the contents of the presented information presented by the information presentation section to be changed at arbitrary times.

* * * * *